US006320009B1

(12) United States Patent
Nakano et al.

(10) Patent No.: US 6,320,009 B1
(45) Date of Patent: Nov. 20, 2001

(54) POLYPROPYLENE RESIN COMPOSITION AND INJECTION-MOLDED ARTICLE

(75) Inventors: Yoshifumi Nakano; Yoshiyuki Sakuda; Mikio Hashimoto, all of Sakai; Hideki Nakagawa, Sayama; Hiroshi Yoshikawa, Takaishi, all of (JP)

(73) Assignee: Grand Polymer Co Ltd, Tokyo (JP)

( * ) Notice: Subject to any disclaimer, the term of this patent is extended or adjusted under 35 U.S.C. 154(b) by 0 days.

(21) Appl. No.: 09/230,482

(22) PCT Filed: May 28, 1998

(86) PCT No.: PCT/JP98/02347

§ 371 Date: Jan. 26, 1999

§ 102(e) Date: Jan. 26, 1999

(87) PCT Pub. No.: WO98/54233

PCT Pub. Date: Dec. 3, 1998

(30) Foreign Application Priority Data

May 30, 1997 (JP) ..................................... 9-142366

(51) Int. Cl.[7] ............................ C08F 10/06; C08F 110/06
(52) U.S. Cl. ............................................... 526/351
(58) Field of Search .................... 526/351, 79, 86

(56) References Cited

U.S. PATENT DOCUMENTS 5,532,325 * 7/1996 Oka et al. .............................. 526/79

FOREIGN PATENT DOCUMENTS

| 0463406A | 1/1992 | (EP) . |
|---|---|---|
| 0573862 | 12/1993 | (EP) . |
| 0641807A | 3/1995 | (EP) . |
| 0665243A | 8/1995 | (EP) . |
| 0708146 | 4/1996 | (EP) . |
| 0736552A | 10/1996 | (EP) . |
| 0 736 552 A2 * | 10/1996 | (EP) . |
| 0775714 | 5/1997 | (EP) . |
| 0841348A | 5/1998 | (EP) . |
| 59149907 | 8/1984 | (JP) . |
| 4202507 | 7/1992 | (JP) . |
| 6 93034 | 4/1994 | (JP) . |
| 8120157 | 5/1996 | (JP) . |
| 9263606 | 10/1997 | (JP) . |

* cited by examiner

Primary Examiner—David W. Wu
Assistant Examiner—B. Harlan

(57) ABSTRACT

The present invention provides a polypropylene-based resin composition which is light weighing, has a very high values of stiffness and heat resistance, exhibits superior scratch-proof property and is superior in the processibility with better flowability upon molding thereof, especially that can favorably be used for injection molding. The polypropylene-based resin composition according to the present invention is constituted predominantly of polypropylene and has the following characteristic features A and B:

A: a melt flow rate (MFR), determined at 230° C. under a load of 2.16 kg, in the range of 5–50 g/10 min. and B: a content of a high molecular weight polypropylene having an intrinsic viscosity [η] of 9–13 dl/g in the range of 15–30% by weight.

19 Claims, No Drawings

POLYPROPYLENE RESIN COMPOSITION AND INJECTION-MOLDED ARTICLE

FIELD OF THE TECHNIQUE

The present invention relates to a resin composition based on polypropylene and injection-molded articles made of such resin composition.

BACKGROUND OF THE TECHNIQUE

Polypropylene has widely been used in various fields including parts in automobile, parts for machines, parts for electric appliances, household commodities, kitchen utensils, packaging films and so on, wherein improvements in the performances thereof have been proposed by incorporation of additives therein which provide facilitation of requisite properties. For example, addition of an inorganic filler, such as talc, has been practised for improving stiffness and heat resistance. However, a plastic resin containing talc exhibits disadvantages, such as higher density, tendency to easy occurrence of surface damages and scratches on articles molded therefrom and tendency to whitening of the damaged portion.

In Japanese Patent Kokai Hei-6-93034 A (corresponding European Patent Application No. EP 573862 A2), a polypropylene product is described in which the processability in molten state is improved. This polypropylene product exhibits, however, insufficient improvements in the mechanical properties, such as inferior flexural modulus and lower thermal deformation temperature.

In Japanese Patent Kokai Hei-4-202507 A, a process for producing a polypropylene resin in multiple polymerization staged in the presence of a catalyst having a specific solid titanium catalyst component is described, in which it is said that the resulting polypropylene resin is superior in the stiffness, heat resistance and so on. However, this process requires a prepolymerization of, such as, 3-methyl-1-butene, and is complicated. The polypropylene resin obtained by this process exhibits insufficient improvement in the stiffness.

In Japanese Patent Kokai Sho-59-172507 A, a process for producing a polypropylene resin superior in the stiffness, processability and heat resistance is described, in which propylene is polymerized in two polymerization stages using a Ziegler catalyst. In this polypropylene resin, however, the improvements in the flexural modulus and in the stiffness are insufficient.

Japanese Patent Kokai Hei-4-370103 discloses a process for producing a polypropylene resin superior in the processibility and stiffness in a multi-stage polymerization using a specific catalyst. This polypropylene resin provides, however, insufficient improvement in the flexural modulus.

The object of the present invention is to provide a polypropylene resin composition, which is light-weighing and has very high values of stiffness and heat resistance, superior scratch-proof or anti-damaging property and better flowability upon molding or shaping with superior processability, as well as injection molded articles made of such polypropylene resin composition.

DISCLOSURE OF THE INVENTION

The present invention provides for the following polypropylene resin composition and injection-molded articles:

(1) A resin composition based on polypropylene (which is referred to in the following as "the first polypropylene-based resin composition"), comprising a predominant proportion of polypropylene and having the following characteristic features A and B, namely, A: a melt flow rate (MFR), determined at 230° C. under a load of 2.16 kg, in the range of 5–50 g/10 min. and B: a content of a high molecular weight polypropylene having an intrinsic viscosity [η] of 9–13 dl/g in the range of 15–30% by weight.

(2) A resin composition based on polypropylene as defined in the above (1), wherein it has the following further characteristic feature C, namely, C: an isotactic pentad proportion (mmmm proportion) determined by $^{13}$C-NMR of 98.0% or higher.

(3) A resin composition based on polypropylene as defined in the above (1) or (2), wherein it has the following further characteristic feature D, namely, D: a molecular weight distribution expressed by Mw/Mn determined by gel permeation chromatography (GPC) of 20 or higher and a molecular weight distribution expressed by Mz/Mw of 7 or higher.

(4) A resin composition based on polypropylene as defined in any one of the above (1) to (3), wherein it has the following further characteristic features E to I, namely, E: a specific gravity determined by water-displacement method (ASTM D 1505) of 0.915 or lower, F: a flexural modulus (ASTM D 790) of 2600 MPa or higher, G: a thickness of the skin layer of at least 300 μm, which is formed on an injection-molded article when the resin composition of 190° C. is injected into a mold of 60° C. and held therein for 30 seconds.

H: a heat distortion temperature (ASTM D 648, under a load of 0.45 MPa) of 145° C. or higher and I: a heat distortion temperature (ASTM D 648, under a load of 1.82 MPa) of 100° C. or higher.

(5) A resin composition based on polypropylene (which is referred to in the following as "the second polypropylene-based resin composition"), comprising a predominant proportion of polypropylene and having the following characteristic features C to H, namely, C: an isotactic pentad proportion (mmmm proportion) determined by $^{13}$C-NMR of 98.0% or higher.

D: a molecular weight distribution expressed by Mw/Mn determined by gel permeation chromatography (GPC) of 20 or higher and a molecular weight distribution expressed by Mz/Mw of 7 or higher.

E: a specific gravity determined by water-displacement method (ASTM D 1505) of 0.915 or lower, F: a flexural modulus (ASTM D 790) of 2600 MPa or higher, G: a thickness of the skin layer of at least 300 μm, which is formed on an injection-molded article when the resin composition of 190° C. is injected into a mold of 60° C. and held therein for 30 seconds, and H: a heat distortion temperature (ASTM D 648, under a load of 0.45 MPa) of 145° C. or higher.

(6) A resin composition based on polypropylene, comprising a predominant proportion of polypropylene and having the following characteristic features C to H, namely, C: an isotactic pentad proportion (mmmm proportion) determined by $^{13}$C-NMR of 98.0% or higher.

D: a molecular weight distribution expressed by Mw/Mn determined by gel permeation chromatography (GPC) of 20 or higher and a molecular weight distribution expressed by Mz/Mw of 8 or higher.

E: a specific gravity determined by water-displacement method (ASTM D 1505) of 0.910 or lower, F: a flexural modulus (ASTM D 790) of 2500 MPa or higher, G: a thickness of the skin layer of at least 380 μm, which is formed on an injection-molded article when the resin composition of 190° C. is injected into a mold of 60° C. and held therein for 30 seconds, and H: a heat distortion temperature (ASTM D 648, under a load of 0.45 MPa) of 150° C. or higher.

(7) A resin composition based on polypropylene as defined in the above (5) or (6), wherein it has the following further characteristic features A and B, namely, A: a melt flow rate (MFR), determined at 230° C. under a load of 2.16 kg, in the range of 5–50 g/10 min. and B: a content of a high molecular weight polypropylene having an intrinsic viscosity [η] of 9–13 dl/g in the range of 15–30% by weight.

(8) A resin composition based on polypropylene as defined in any one of the above (5) to (7), wherein it has the following further characteristic feature I, namely, I: a heat distortion temperature (ASTM D 648, under a load of 1.82 MPa) of 100° C. or higher.

(9) A resin composition for injection molding based on polypropylene, comprising a predominant proportion of polypropylene and having the following characteristic features C to H, namely, C: an isotactic pentad proportion (mmmm proportion) determined by $^{13}$C-NMR of 98.0% or higher.

D: a molecular weight distribution expressed by Mw/Mn determined by gel permeation chromatography (GPC) of 20 or higher and a molecular weight distribution expressed by Mz/Mw of 8 or higher.

E: a specific gravity determined by water-displacement method (ASTM D 1505) of 0.910 or lower, F: a flexural modulus (ASTM D 790) of 2500 MPa or higher, G: a thickness of the skin layer of at least 380 μm, which is formed on an injection-molded article when the resin composition of 190° C. is injected into a mold of 60° C. and held therein for 30 seconds, and H: a heat distortion temperature (ASTM D 648, under a load of 0.45 MPa) of 150° C. or higher.

(10) A resin composition based on polypropylene as defined in any one of the above (1) to (8), wherein it is for injection molding.

(11) Injection molded articles produced by injection molding a resin composition based on polypropylene as defined in any one of the above (1) to (10).

In the context of this specification, a mere denotation of "the resin composition based on polypropylene according to the present invention" does comprehend both the above-mentioned first and second polypropylene-based resin compositions.

The First Polypropylene-based Resin Composition

The first polypropylene-based resin composition comprises a predominant proportion of polypropylene and has, for the resin composition as a whole, the following characteristic features A and B:

A: A melt flow rate (MFR), determined at 230° C. under a load of 2.16 kg, in the range of 5–50 g/10 min., preferably 10–35 g/10 min.

B: A content of a high molecular weight polypropylene having an intrinsic viscosity [η] determined in decalin (decahydronaphthalene) at 135° C. of 9–13 dl/g, preferably 9–10 dl/g, in the range of 15–30% by weight, preferably 15–25% by weight For the first polypropylene-based resin composition according to the present invention, preference is given for those which has, in addition to the above characteristic features A and B, further the following characteristic feature C:

C: An isotactic pentad proportion (mmmm proportion) determined by $^{13}$C-NMR of 98.0% or higher, preferably 98.5% or higher For the first polypropylene-based resin composition according to the present invention, preference is given also for those which has, in addition to the above characteristic features A and B or the features A to C, further the following characteristic feature D:

D: A molecular weight distribution expressed by Mw/Mn (namely, weight-average molecular weight/number-average molecular weight), determined by gel permeation chromatography (GPC) of 20 or higher, preferably 25 or higher and a molecular weight distribution expressed by Mz/Mw (namely, z-average molecular weight/weight-average molecular weight) of 7 or higher, preferably 8 or higher For the first polypropylene-based resin composition according to the present invention, preference is also given for those which has, in addition to the above characteristic features A and B, the features A to C or the features A to D, further the following characteristic features E to I:

E: A specific gravity determined by water-displacement method (ASTM D 1505) of 0.915 or lower, preferably 0.912 or lower F: A flexural modulus (ASTM D 790) of 2600 MPa or higher, preferably 2800 MPa or higher G: A thickness of the skin layer of at least 300 μm, preferably at least 400 μm, which is formed on an injection-molded article when the resin composition of 190° C. is injected into a mold of 60° C. and held therein for 30 seconds H: A heat distortion temperature (ASTM D 648, under a load of 0.45 MPa) of 145° C. or higher, preferably 150° C. or higher I: A heat distortion temperature (ASTM D 648, under a load of 1.82 MPa) of 100° C. or higher, preferably 110° C. or higher The above-mentioned isotactic pentad proportion (mmmm proportion) corresponds to the proportion of the isotactic chains as the pentad unit in the polypropylene molecular chains, which is determined using $^{13}$C-NMR and which is the proportion of the number of propylene monomeric units present in each center of the sequences of 5 monomeric propylene units bound each successively by meso-coupling. This can be determined in the practice as the proportion of the mmmm peaks relative to the entire absorption peaks within the methyl carbon region in the $^{13}$C-NMR spectrum.

The values of Mw/Mn and Mz/Mw are determined by gel permeation chromatography (GPC). The above-mentioned specific gravity is determined by water-displacement method under the condition according to ASTM D 1505. The above-mentioned flexural modulus is determined under the condition according to ASTM D 790. The above-mentioned heat distortion temperature is determined according to ASTM D 648 under a load of 0.45 MPa or 1.82 MPa.

The thickness of the skin layer mentioned above is that of the skin layer formed on the surface of an injection-molded article when the resin composition based on polypropylene of 190° C. is injected into a mold of 60° C. and held therein for 30 seconds. Here, the "skin layer" means the layer over the injection-molded article in which the polymer molecules are highly oriented towards flow direction near the surface and there is no spherulite and which has therefore a different crystal structure from that of the central portion of the article. The skin layer thickness is determined by observing the vertical cross section of the molded article under an optical microscope.

The polypropylene constituting the predominant component of the first polypropylene-based resin composition according to the present invention may preferably be composed exclusively of the structural unit derived from propylene, though it may include other structural unit(s) derived from other comonomer(s) than propylene in a small proportion, such as 10 mole % or lower, preferably 5 mole % or lower. Such other comonomer may include, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present as copolymers of two or more of them.

The first polypropylene-based resin component according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like. The prepolymer derived from such a branched olefin may serve as a nucleating agent for the polypropylene and can be used for increasing the isotactic pentad proportion and for improving the processibility.

The first polypropylene-based resin composition according to the present invention may be constituted exclusively of polypropylene or contain other resin(s) than polypropylene in a small proportion. When a polymer product of propylene having the characteristic features A and B defined above can be obtained in a single stage polymerization, this can be used as such for the polypropylene constituting the first polypropylene-based resin composition according to the present invention. In general, however, the polypropylene for the first resin composition may include a relatively lower molecular weight part and a relatively higher molecular weight part. While it is permissible for this case to melt-blend polypropylene products having different molecular weights produced separately, in order to thereby obtain a blended product, it is preferable to produce a polypropylene product including polypropylene fractions having different molecular weights in multiple polymerization stages so as to obtain a polypropylene product having a relatively lower molecular weight part and a relatively higher molecular weight part.

The polypropylene constituting the first polypropylene-based resin composition according to the present invention may also be a block-copolymer of propylene, such as propylene/ethylene block-copolymer or the like, which is favorable due to a possible attainment of a superior impact resistance in addition to a superior stiffness. While there is no restriction as to the kind of such block-copolymer of propylene, special preference is given to a propylene/ethylene block-copolymer having an intrinsic viscosity [η] of 0.5–10 dl/g, a propylene/ethylene block-copolymer having an ethylene content of 40% by weight or less or the like.

The Second Polypropylene-based Resin Composition

The second polypropylene-based resin composition according to the present invention comprises a predominant proportion of polypropylene and has, for the resin composition as a whole, the following characteristic features C to H:

C: An isotactic pentad proportion (mmmm proportion), determined by $^{13}$C-NMR, of 98.0% or higher, preferably 98.5 or higher D: A molecular weight distribution expressed by Mw/Mn (namely, weight-average molecular weight/number-average molecular weight), determined by gel permeation chromatography (GPC), of 20 or higher, preferably 25 or higher and a molecular weight distribution expressed by Mz/Mw (namely, z-average molecular weight/weight-average molecular weight) of 7 or higher, preferably 8 or higher E: A specific gravity determined by water-displacement method (ASTM D 1505) of 0.915 or lower, preferably 0.912 or lower, more preferably 0.910 or lower F: A flexural modulus (ASTM D 790) of 2500 MPa, preferably 2600 MPa or higher, more preferably 2800 MPa or higher G: A thickness of the skin layer of at least 300 μm, preferably at least 380 μm, more preferably at least 400 μm, which skin layer is formed on an injection-molded article when the resin composition of 190° C. is injected into a mold of 60° C. and held therein for 30 seconds H: A heat distortion temperature (ASTM D 648, under a load of 0.45 MPa) of 145° C. or higher, preferably 150° C. or higher For the second polypropylene-based resin composition according to the present invention, preference is given to those which have further, in addition to the characteristic features C to H given above, the following characteristic features A and B:

A: A melt flow rate (MFR), determined at 230° C. under a load of 2.16 kg, in the range of 5–50 g/10 min., preferably 10–35 g/10 min.

B: A content of a high molecular weight polypropylene having an intrinsic viscosity [η] determined in dacalin at 135° C. of 9–13 dl/g, preferably 9–10 dl/g, in the range of 15–30% by weight, preferably 15–25% by weight For the second polypropylene-based resin composition according to the present invention, preference is also given to those which have further, in addition to the characteristic features C to H or A to H given above, the following characteristic feature I:

I: A heat distortion temperature (ASTM D 648, under a load of 1.82 MPa) of 100° C. or higher, preferably 110° C. or higher The above-mentioned isotactic pentad proportion (mmmm proportion) corresponds to the proportion of the isotactic chains as the pentad unit in the polypropylene molecular chains, which is determined using $^{13}$C-NMR and which is the proportion of the number of propylene monomeric units present in each center of the sequenses of 5 monomeric propylene units bound each successively by meso-coupling. This can be determined in the practice as the proportion of the mmmm peaks relative to the entire absorption peaks within the methyl carbon region in the $^{13}$C-NMR spectrum.

The values of Mw/Mn and Mz/Mw are determined by gel permeation chromatography (GPC). The above-mentioned specific gravity is determined by water-displacement method under the condition according to ASTM D 1505. The above-mentioned flexural modulus is determined under the condition according to ASTM D 790. The above-mentioned heat distortion temperature is determined according to ASTM D 648 under a load of 0.45 MPa or 1.82 MPa.

The thickness of the skin layer mentioned above is that of the skin layer formed on the surface of an injection-molded article when the resin composition based on polypropylene of 190° C. is injected into a mold of 60° C. and held therein for 30 seconds. Here, the "skin layer" means the layer over the injection-molded article in which the polymer molecules are highly oriented towards flow direction near the surface and there is no spherulite and which has therefore a different crystal structure from that of the central portion of the article. The skin layer thickness is determined by observing the vertical cross section of the molded article under an optical microscope.

The polypropylene constituting the predominant component of the second polypropylene-based resin composition according to the present invention may preferably be composed exclusively of the structural unit derived from propylene, though it may include other structural unit(s) derived from other comonomer(s) than propylene in a small proportion, such as 10 mole % or lower, preferably 5 mole % or lower. Such other comonomer may include, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present as copolymers of two or more of them.

The second polypropylene-based resin component according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like. The prepolymer derived from such a branched olefin may serve as a nucleating agent for the polypropylene and can be used for increasing the isotactic pentad proportion and for improving the processibility.

The second polypropylene-based resin composition according to the present invention may be constituted exclusively of polyproptlene or contain other resin(s) than polypropylene in a small proportion. When a polymer product of propylene having the characteristic features C to H defined above can be obtained in a single stage polymerization, this can be used as such for the polypropylene constituting the second polypropylene-based resin composition according to the present invention. However, the polypropylene for the second resin composition may, in general, include a relatively lower molecular weight part and a relatively higher molecular weight part. While it is permissible for this case to melt-blend polypropylene products having different molecular weights produced separately, in order to thereby obtain a blended product, it is preferable to produce a polypropylene product including polypropylene fractions having different molecular weights in multiple polymerization stages so as to obtain a polypropylene product having a relatively lower molecular weight part and a relatively higher molecular weight part.

The polypropylene constituting the second polypropylene-based resin composition according to the present invention may also be a block-copolymer of propylene, such as propylene/ethylene block-copolymer or the like, which is favorable due to a possible attainment of a superior impact resistance in addition to a superior stiffness. While there is no restriction as to the kind of such block-copolymer of propylene, special preference is given to a propylene/ethylene block-copolymer having an intrinsic viscosity [η] of 0.5–10 dl/g, a propylene/ethylene block-copolymer having an ethylene content of 40% by weight or less or the like.

As a preferred technique for producing the first and the second polypropylene-based resin compositions, there may be applied, for example, a technique in which propylene is polymerized alone or together with other comonomer(s) in two or more polymerization stages in the presence of a catalyst for producing highly stereospecific polypropylene.

For the catalyst for producing the highly stereospecific polypropylene mentioned above, there may be employed for example, a catalyst composed of (a) a solid catalyst component based on titanium, which has contents of magnesium, titanium, halogen and an electron donating agent, (b) an organometallic compound and (c) an electron donor.

The solid catalyst component based on titanium (a) can be prepared by bringing a magnesium compound (a-1), a titanium compound (a-2) and an electron donor (a-3) into contact with each other.

As the magnesium compound (a-1), those which exhibit reducing function and those which do not exhibit any reducing function may be employed.

As the magnesium compound which exhibits a reducing function, there may be enumerated those having magnesium-carbon linkage or magnesium-hydrogen linkage. Concrete examples therefor include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium hydride.

As the magnesium compound which do not exhibit reducing function, there may be enumerated, for example, magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; alkoxymagnesiums, such as ethoxymagnesium, isopropoxymagnesium, butoxymagnesium, n-octoxymagnesium and 2-ethylhexoxymagnesium; aryloxymagnesiums, such as phenoxymagnesium and dimethylphenoxymagnesium; and carboxylic acid salts, such as magnesium laurate and magnesium stearate.

The magnesium compounds exhibiting no reducing function may be those derived from magnesium compounds exhibiting reducing function or those derived upon the preparation of a catalyst component. For deriving the magnesium compound exhibiting no reducing function from a magnesium compound exhibiting a reducing function, it is enough, for example, to bring the magnesium compound exhibiting a reducing function into contact with a polysiloxane compound, a halogen-containing silane compound, a halogen-containing aluminum compound, an ester, alcohol, halogen-containing compound or an active carbon-to-oxygen linkage-containing compound, such as ketone.

The magnesium compound (a-1) may be prepared during the preparation of the catalyst from magnesium metal. The magnesium compound (a-1) may be employed in a combination of two or more of them. The magnesium compound (a-1) may be present as a complex or a composite compound with other metal(s), such as aluminum, zinc, boron, beryllium, sodium and potassium, or may be a mixture with compound(s) of other metal(s).

While, according to the present invention, many magnesium compounds other than those given above can be employed, such other magnesium compounds may favorably be present in the titanium-based solid catalyst component (a) in a form of a halogen-containing magnesium compound. Therefore, on using a magnesium compound having no halogen content, the magnesium compound should preferably be subjected to a reaction under contact with a halogen-containing compound during preparation of a catalyst component.

Among the above-mentioned magnesium compounds, especially those having no reducing function are preferred, wherein particular preference is given to those having halogen content, for example, magnesium chloride, alkoxymagnesium chlorides and aryloxymagnesium chlorides.

The magnesium compound (a-1) according to the present invention may preferably be used in the preparation of a catalyst component in a liquid form, wherein the magnesium compound (a-1) of a solid form can be converted into liquid form using an electron donor.

As the liquefying agent, for example, alcohols, phenols, ketones, aldehydes, ethers, amines and pyridines, which will be described afterwards as the electron donor, may be used and, further, also esters of acidic metalates, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium, may be used. Among them, special preference is given to alcohols and metalate esters.

The reaction for liquefying the solid magnesium compound (a-1) may, in general, be performed by contacting the solid magnesium compound with an above-mentioned liquefying agent with, if necessary, heating. This contact with the liquefying agent may be realized usually at a temperature of 0–200° C., preferably 20–180° C., more preferably 50–150° C.

The liquefying reaction may be performed in the co-existence of a solvent, such as a hydrocarbon, for example, an aliphatic hydrocarbon, such as pentane, hexane, heptane, octane, decane, dodecane, tetradecane or kerosine; an alicyclic hydrocarbon, such as cyclopentane, methylcyclopentane, cyclohexane, methylcyclohexane, cyclooctane or cyclohexene; a halogenated hydrocarbon, such as dichloroethane, dichloropropane, trichloroethylene or chlorobenzene; or an aromatic hydrocarbon, such as benzene, toluene or xylene.

In preparing the titanium-based solid catalyst component (a), it is preferable that, for example, a tetravalent titanium compound represented by the formula (1) given below is employed as the titanium compound (a-2).

$$Ti(OR)_gX_{4-g} \tag{1}$$

In the formula (1), R represents a hydrocarbon group, X denotes a halogen atom and g is in the range of $0 \leq g \leq 4$.

Concrete examples of the above titanium compound represented by the formula (1) include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$. Among them, preference is given to halogen-containing titanium compounds, especially, titanium tetrahalides, in particular, titanium tetrachloride.

The titanium compound (a-2) may be employed in combination of two or more of the compounds. The titanium compound (a-2) can be used under dilution with a solvent, such as a hydrocarbon or a halogenated hydrocarbon.

For the electron donor (a-3) to be incorporated in the preparation of the titanium-based solid catalyst component (a), there may be exemplified alcohols, phenols, ketones, aldehydes, esters of organic or inorganic acids, organic acid halides, ethers, acid amides, acid anhydrides, ammonia, amines, nitriles, isocyanates, nitrogen-containing cyclic compounds and oxygen-containing cyclic compounds. More concretely, they include alcohols having 1–18 carbon atoms, such as methanol, ethanol, propanol, pentanol, hexanol, octanol, 2-ethyl-hexanol, dodecanol, octadecyl alcohol, oleyl alcohol, benzyl alcohol, phenylethyl alcohol, cumyl alcohol, isopropyl alcohol and isopropylbenzyl alcohol; phenols having 6–20 carbon atoms which may contain lower alkyl group(s), such as phenol, cresol, xylenol, ethylphenol, propylphenol, nonylphenol, cumylphenol and naphthol; ketones having 3–15 carbon atoms, such as acetone, methyl ethyl ketone, methyl isobutyl ketone, acetophenone, benzophenone, acetyl-acetone and benzoquinone; and aldehydes having 2–15 carbon atoms, such as acetaldehyde, propionaldehyde, octyl aldehyde, benzaldehyde, tolualdehyde and naphthaldehyde.

As further examples, there may be enumerated esters of organic acids having 2–30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexene-carboxylate, diethyl ester of Nadic acid, diisopropyl tetrahydrophthalate, diethyl phthalate, diisobutyl phthalate, di-n-butyl phthalate, di-2-ethylhexyl phthalate, γ-butyrolactone, δ-valerolactone, cumarin, phthalide and ethyl carbonate; acid halides having 2–15 carbon atoms, such as acetyl chloride, benzoyl chloride, toluyl chloride and anisyl chloride; ethers having 2–20 carbon atoms, such as methyl ether, ethyl ether, isopropyl ether, butyl ether, amyl ether, anisole and diphenyl ether-epoxy-p-menthane; acid amides, such as acetic amide, benzoic acid amide and toluic acid amide; acid anhydrides, such as acetic anhydride, phthalic anhydride and benzoic anhydride; amines, such as methylamine, ethylamine, dimethylamine, diethylamine, ethylenediamine, tetramethylenediamine, hexamethylenediamine, tributylamine and tribenzylamine; nitriles, such as acetonitrile, benzonitrile and tolunitrile; heterocyclic nitrogen-containing compounds, for example, pyrroles, such as pyrrole, methylpyrrole and dimethylpyrrole, pyridines, such as pyrroline, pyrrolidine, indole, pyridine, methylpyridine, ethylpyridine, propylpyridine, dimethylpyridine, ethylmethylpyridine, trimethylpyridine, phenylpyridine, benzylpyridine and chloropyridine, piperidines, quinolines and isoquinolines; and heterocyclic oxygen-containing compounds, such as tetrahydrofuran, 1,4-cineole, 1,8-cineole, pinolfuran, methylfuran, dimethylfuran, diphenylfuran, benzofuran, cumaran, phthalan, tetrahydropyran, pyran and dihydropyran.

As the organic acid esters to be used as the electron donor (a-3), esters of polyvalent carboxylic acids having molecular skeleton represented by the formula (2) given below are especially preferred.

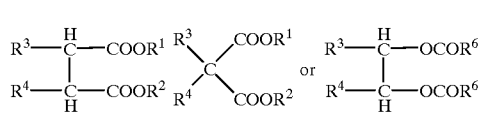

(2)

In the formula (2), $R^1$ denotes a substituted or unsubstituted hydrocarbon group, $R^2$, $R^5$ and $R^6$ denote each hydrogen atom or a substituted or unsubstituted hydrocarbon group, $R^3$ and $R^4$ represent each hydrogen atom or a substituted or unsubstituted hydrocarbon group with at least one of them being preferably a substituted or unsubstituted hydrocarbon group. $R^3$ and $R^4$ may also build up together a cyclic structure by being combined with each other. When the hydrocarbon groups $R^1$ to $R^6$ are substituted ones, the substituent groups may contain one or more heteroatoms, such as N, O or S, and may contain atom group(s) of, for example, C—O—C, COOR, COOH, OH, $SO_3H$, C—N—C and $NH_2$.

As the esters of polyvalent carboxylic acid, there may be enumerated concretely, for example, esters of aliphatic polycarboxylic acids, such as diethyl succinate, dibutyl succinate, diethyl methyl succinate, diisobutyl α-methyl glutarate, diethyl methyl malonate, diethyl ethyl malonate, diethyl isopropyl malonate, diethyl butyl malonate, diethyl phenyl malonate, diethyl diethyl malonate, diethyl dibutyl malonate, monooctyl maleate, dioctyl maleate, dibutyl maleate, dibutyl butyl maleate, diethyl butyl maleate, diisopropyl β-methyl glutarate, diallyl ethyl succinate, di-2-ethyl-hexyl fumarate, diethyl itaconate and dioctyl citraconate; esters of alicyclic polycarboxylic acids, such as diethyl 1,2-cyclohexane carboxylate, diisobutyl 1,2-cyclohexane carboxylate, diethyl tetrahydro phthalate and diethyl ester of Nadic acid; esters of aromatic polycarboxylic acids, such as monoethyl phthalate, dimethyl phthalate, methyl ethyl phthalate, monoisobutyl phthalate, diethyl phthalate, ethyl isobutyl phthalate, di-n-propyl phthalate, diisopropyl phthalate, di-n-butyl phthalate, diisobutyl phthalate, di-n-heptyl phthalate, di-2-ethyl-hexyl phthalate, di-n-octyl phthalate, dineopentyl phthalate, didecyl phthalate, benzyl butyl phthalate, diphenyl phthalate, diethyl naphthalene dicarboxylate, dibutyl naphthalene dicarboxylate, triethyl trimellitate and dibutyl trimellitate; and esters of heterocyclic polycarboxylic acids, such as 3,4-furan-dicarboxylates.

For the esters of polyvalent carboxylic acids, there may further be enumerated, for example, esters of long-chain dicarboxylic acids, such as diethyl adipate, diisobutyl adipate, diisopropyl sebacate, di-n-butyl sebacate, di-n-octyl sebacate and di-2-ethyl-hexyl sebacate.

As the electron donor (a-3), there may further be employed the organosilicic compounds and polyether compounds to be used as the electron donor component (c) described afterwards, as well as water and anionic, cationic and non-ionic surfactants.

As the electron donor (a-3), preference is given to esters of carboxylic acids, especially, to esters of polycarboxylic acids, in particular, esters of phthalic acid. The electron donor (a-3) may be employed also in combination of two or more of them.

In contacting the magnesium compound (a-1), the titanium compound (a-2) and the electron donor (a-3) with each other, it is permissible that other reaction reagent, such as silicon, phosphorus or aluminum, may be caused to be present simultaneously and it is also permissble to incorporate a solid catalyst carrier for preparing a carrier-supported solid titanium catalyst component (a).

For such carriers, there may be exemplified $Al_2O_3$, $SiO_2$, $B_2O_3$, MgO, CaO, $TiO_2$, ZnO, $SnO_2$, BaO and ThO as well as resins, such as styrene/divinylbenzene copolymer and the like. Among them, $Al_2O_3$, $SiO_2$ and styrene/divinylbenzene copolymer are employed preferably.

The titanium-based solid catalyst component (a) may be prepared by any technique including known one. Examples of such preparation technique are given below in a brief description:

(1) A technique in which a solution of the magnesium compound (a-1) in a hydrocarbon solvent containing the electron donor (the liquefying agent) (a-3) is brought into contact with the organometallic compound to cause a reaction to precipitate solid matter which is then, or in the course of precipitation, brought into contact with the titanium compound (a-2) to cause reaction.

(2) A technique in which a complex composed of the magnesium compound (a-1) and the electron donor (a-3) is brought into contact with the organometallic compound to cause reaction and, then, the titanium compound (a-2) is caused to contact and react therewith.

(3) A technique in which the contacted product from the contact of an inorganic carrier with an organomagnesium compound (a-1) is brought into contact with the titanium compound (a-2) and with the electron donor (a-3) to cause reaction therebetween. Here, it is permissible to bring the product of contact of the carrier with the magnesium compound into contact with a halogen-containing compound and/or an organometallic compound preliminarily.

(4) A technique, wherein a solid carrier, which is obtained from a mixture containing a solution of the magnesium compound (a-1), the electron donor (a-3) and the carrier in a liquid medium of the liquefying agent and, optionally, a hydrocarbon solvent and on which the magnesium compound (a-1) is supported, is contacted with the titanium compound (a-2).

(5) A technique in which a solution containing the magnesium compound (a-1), the titanium compound (a-2), the electron donor (a-3) and, optionally, a hydrocarbon solvent is brought into contact with a solid carrier.

(6) A technique in which an organomagnesium compound (a-1) in liquid form and a halogen-containing titanium compound (a-2) are brought into contact with each other. In this case, the electron donor (a-3) is used at least once.

(7) A technique in which an organomagnesium compound (a-1) in liquid form and a halogen-containing titanium compound (a-2) are brought into contact with each other, whereupon the resulting product is caused to contact with the titanium compound (a-2). In this case, the electron donor (a-3) is used at least once.

(8) A technique in which an alkoxyl group-containing magnesium compound (a-1) is brought into contact with a halogen-containing titanium compound (a-2). In this case, the electron donor (a-3) is used at least once.

(9) A technique in which a complex composed of an alkoxyl group-containing magnesium compound (a-1) and of the electron donor (a-3) is brought into contact with the titanium compound (a-2).

(10) A technique in which a complex composed of an alkoxyl group-containing magnesium compound (a-1) and the electron donor (a-3) is brought into contact with an organometallic compound, whereupon the resulting product is brought into contact with the titanium compound (a-2).

(11) A technique in which the magnesium compound (a-1), the electron donor (a-3) and the titanium compound (a-2) are brought into contact with each other in a voluntary order to cause reactions therebetween. It is permissible to incorporate a pretreatment of each reaction component before these reactions using a reaction assistant, such as an electron donor (a-3), an organometallic compound, a halogen-containing silicium compound or the like.

(12) A technique in which a liquid magnesium compound (a-1) exhibiting no reducing function is caused to react with a liquid titanium compound (a-2) in the presence of the electron donor (a-3) to deposit a solid magnesium/titanium composite product.

(13) A technique in which the reaction product obtained in the above (12) is further reacted with the titanium compound (a-2).

(14) A technique in which the reaction product obtained in the above (11) or (12) is further reacted with the electron donor (a-3) and with the titanium compound (a-2).

(15) A technique in which a solid mixture obtained by crushing the magnesium compound (a-1), the titanium compound (a-2) and the electron donor (a-3) is treated with either an elementary halogen, a halogen compound or an aromatic hydrocarbon. In this case, it is permissible to incorporate a process step of crushing either the magnesium compound (a-1) solely, a complex composed of the magnesium compound (a-1) and of the electron donor (a-3) or the magnesium compound (a-1) and the titanium compound (a-2). It is also permissible to subject the crushed product to a pretreatment with a reaction assistant, followed by an after-treatment with, such as, an elementary halogen. As the reaction assistant, for example, an organometallic compound or a halogen-containing silicium compound, may be employed.

(16) A technique in which the magnesium compound (a-1) is crushed and the resulting crushed product is brought into contact with the titanium compound (a-2). Upon crushing and/or contacting the magnesium compound (a-1), an electron donor (a-3) may, if necessary, be employed together with a reaction assistant.

(17) A technique in which the product obtained in either of the above (11)–(16) is treated with an elementary halogen or a halogen compound or with an aromatic hydrocarbon.

(18) A technique in which a reaction product resulting after the metal oxide, the organomagnesium compound (a-1) and the halogen-containing compound are contacted with each other is caused to contact with the electron donor (a-3) and with, preferably, the titanium compound (a-2).

(19) A technique in which a magnesium compound (a-1), such as a magnesium salt of an organic acid, an alkoxymagnesium or an aryloxymagnesium, is brought into contact with the titanium compound (a-2), with the electron donor (a-3) and, if necessary, further with a halogen-containing hydrocarbon.

(20) A technique in which a solution of the magnesium compound (a-1) and an alkoxytitanium in a hydrocarbon solvent is brought into contact with the electron donor (a-3) and, if necessary, further with the titanium compound (a-2). In this case, it is favorable that a halogen-containing compound, such as a halogen-containing silicium compound, is caused to co-exist.

(21) A technique in which a liquid magnesium compound (a-1) exhibiting no reducing function is caused to react with an organometallic compound to cause a composite solid product of magnesium/metal (aluminum) to deposit out and, then, the product is reacted with the electron donor (a-3) and with the titanium compound (a-2).

While the amount of each component to be contacted on preparing the solid titanium catalyst component (a) may be different for each specific technique for the preparation and cannot be defined in a common rule, it is favorable to use, for example, the electron donor (a-3) in an amount in the range of 0.01–10 moles, preferably 0.1–5 moles, and the titanium compound (a-2) in an amount in the range of 0.01–1,000 moles, preferably 0.1–200 moles, respectively, per one mole of the magnesium compound (a-1).

The solid titanium catalyst component (a) prepared in the above manner contains magnesium, titanium, a halogen and an electron donor. In this solid titanium catalyst component (a), it is favorable that the atomic ratio of halogen/titanium amounts to about 2–200, preferably 4–100, the mole ratio of the electron donor/titanium amounts to about 0.01–100, preferably 0.02–10 and the atomic ratio of magnesium/titanium amounts to about 1–100, preferably 2–50.

As the organometallic compound (b) to be used together with the solid titanium catalyst component (a), those which contain a metal selected among the Group I to Group III of the periodic table are preferred. Concretely, there may be exemplified organoaluminum compounds, complex alkyl compounds with Group I metal and aluminum, organometallic compounds of Group II metals and so on, represented by the formulae given below:

An organoaluminum compound (b-1) represented by the formula $$R^1_m Al(OR^2)_n H_p X_q$$

In which $R^1$ and $R^2$ represent each a hydrocarbon group having usually 1–15 carbon atoms, preferably 1–4 carbon atoms, which may be identical with or different from each other, X denotes a halogen atom, m is in the range $0 < m \leq 3$, n is in the range $0 \leq n < 3$, p is in the range $0 \leq p < 3$ and q is in the range $0 \leq q < 3$, wherein $m+n+p+q=3$.

An alkylated complex of a Group I metal and aluminum (b-2) represented by the formula $$M^1AlR^1_4$$

In the formula, $M^1$ is Li, Na or K and $R^1$ has the same meaning as above.

A dialkylated compound of Group II or Group III metal (b-3) represented by the formula $$R^1R^2M^2$$

In the formula, $R^1$ and $R^2$ have the same meanings as above and $M^2$ is Mg, Zn or Cd.

As the organoaluminum compound (b-1), there may be enumerated, for example, those which are represented by the formula $$R^1_mAl(OR^2)_{3-m},$$

in which $R^1$ and $R^2$ have the same meanings as above and m is preferably of $1.5 \leq m \leq 3$; those which are represented by the formula $$R^1_mAlX_{(3-m)},$$

in which $R^1$ has the same meaning as above, X stands for a halogen and m is preferably of $0<m<3$; those which are represented by the formula $$R^1_mAlH_{(3-m)},$$

in which $R^1$ has the same meaning as above and m is preferably of $2 \leq m <3$; and those which are represented by the formula $$R^1_mAl(OR^2)_nX_q,$$

in which $R^1$ and $R^2$ have the same meanings as above, X stands for a halogen, m is in the range $0<m \leq 3$, n is in the range $0 \leq n <3$ and q is in the range $0 \leq q<3$, wherein $m+n+q=3$.

More concretely, the organoaluminum compound (b-1) may be exemplified by trialkylaluminums, such as triethylaluminum and tributylaluminum; trialkenylaluminums, such as triisoprenylaluminum and so on; dialkylaluminum alkoxides, such as diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums, such as those which have an average composition represented by a formula of, for example, $R^1_{2.5}Al(OR^2)_{0.5}$; dialkylaluminum halides, such as diethylaluminum chloride, dibutylaluminum chloride and diethylaluminum bromide; alkylaluminum sesquihalides, such as ethylaluminum sesquichloride, butylaluminum sesquichloride and ethylaluminum sesquibromide; partly halogenated alkylaluminums, such as ethylaluminum dichloride, propylaluminum dichloride and butylaluminum dibromide; dialkylaluminum hydrides, such as diethylaluminum hydride and dibutylaluminum hydride; partially hydrogenated alkylaluminums, for example, alkylaluminum dihydrides, such as ethylaluminum dihydride and propylaluminum dihydride; and partially alkoxylated and halogenated alkylaluminums, such as ethylaluminum ethoxy chloride, butylaluminum butoxy chloride and ethylaluminum ethoxy bromide.

As compounds resembling the organoaluminum compound (b-1), there may be enumerated, organoaluminum compounds in which two or more aluminum atoms are bound together via an oxygen atom or nitrogen atom, such as for example, $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$, as well as aluminoxanes, such as methylaluminoxane and so on.

As the alkylated complex (b-2), there may be enumerated, for example, $LiAl(C_2H_5)_4$ and $LiAl(C_7H_{15})_4$.

As the organometallic compound (b), there may be used favorably organoaluminum compounds (b-1), in particular, trialkylaluminums.

The organometallic compound may be incorporated in combination of two or more.

Concrete examples of the electron donor (c) to be used together with the titanium-based solid catalyst component (a) and the organometallic compound (b) include organosilicon compounds (c-1) represented by the formula (3) given below and compounds (c-2) having two or more ether linkages which are present under intermediation by a plurality of atoms.

$$R^1_nSi(OR^2)_{(4-n)} \qquad (3)$$

In the formula (3), n is an integer of 1, 2 or 3, $R^1$ is a secondary or tertiary hydrocarbyl group when n is 1 and at least one $R^1$ may stand for a secondary or tertiary hydrocarbyl group when n is 2 or 3, the groups $R_1$ being identical with or different from each other, $R^2$ denotes a hydrocarbyl group having 1–4 carbon atoms, wherein the groups $R^2$ may be identical with or different from each other when (4–n) equals to 2 or 3.

As the secondary or tertiary hydrocarbyl group in the organosilicon compounds (c-1) represented by the formula (3), there may be enumerated cyclopentyl, cyclopentenyl, cyclopentadienyl, substituent-containing ones of them and hydrocarbyl groups having secondary or tertiary carbon atom adjoining the silicon atom. More concretely, there may be enumerated as the substituent-containing cyclopentyl group those alkyl-substituted ones, for example, 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

As substituted cyclopentenyl groups, there may be enumerated those alkyl-substituted ones, for example, 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

As substituted cyclopentadienyl groups, there may be enumerated those alkyl-substituted ones, for example, 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

As the hydrocarbyl groups having secondary carbon atom adjoining the silicon atom, there may be exemplified i-propyl, s-butyl, s-amyl and α-methylbenzyl. As the hydrocarbyl groups having tertiary carbon atom adjoining the silicon atom, there may be exemplified t-butyl, t-amyl, α,α'-dimethylbenzyl and adamantyl.

The organosilicon compounds (c-1) represented by the formula (3) in which n is 1 include trialkoxysilanes, for example, cyclopentyltrimethoxysilane, 2-methylcyclopentyltrimethoxysilane, 2,3-dimethylcyclopentyltrimethoxysilane, cyclopentyltriethoxysilane, isobutyltriethoxysilane, t-butyltriethoxysilane, cyclohexyltrimethoxysilane, cyclohexyltriethoxysilane, 2-norbornanetrimethoxysilane and 2-norbornanetriethoxysilane.

As the organosilicic compound (c-1) represented by the formula (3) in which n is 2, there may be enumerated, for example, dialkoxysilanes, such as dicyclopentyldimethoxysilane, dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane, as well as dimethoxy compounds represented by the following formula (4) may be enumerated:

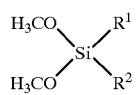

(4)

In the above formula (4), $R^1$ and $R^2$ represent each independently of each other cyclopentyl, a substituted cyclopentyl, cyclopentenyl, a substituted cyclopentenyl, cyclopentadienyl, a substituted cyclopentadienyl or a hydrocarbyl having secondary or tertiary carbon atom adjoining the silicon atom.

As the dimethoxy compounds represented by the formula (4), there may be exemplified:
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentenyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyldimethoxysilane,
di($\alpha,\alpha'$-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane and
isopropyl-s-butyldimethoxysilane.

As the organosilicic compound (c-1) of the formula (3) in which n is 3, there may be enumerated, for example, monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

For the electron donor (c), dimethoxysilanes, especially the dimethoxysilanes represented by the formula (4) are preferred and, concretely, preference is given to dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

The organosilicic compound (c-1) may be used in combination of two or more.

In the compound (c-2) having two or more ether linkages bound under intermediation by a plurality of atoms (referred to hereinafter sometimes as polyether compound) to be used as the electron donor (c), the atoms present between the ether linkages may be of one or more elements selected from the group consisting of carbon, silicon, oxygen, sulfer, phosphorus and boron, wherein the number of atoms are at least two. Among them, preference is given to those in which a relatively bulky substituent, namely, one having at least two, preferably at least three carbon atoms and a linear, branched or cyclic structure, in particular a branched or cyclic structure, is bound to the atom present between the ether linkages. Further, compounds having a plurality of, preferably 3–20, more preferably 3–10, especially 3–7, carbon atoms between two or more ether linkages are preferred.

For such polyether compound (c-2), for example, compounds represented by the formula (5) given below may be exemplified:

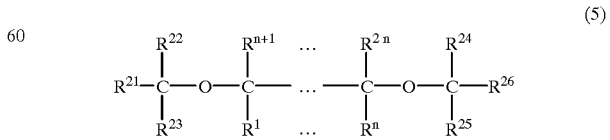

(5)

In the above formula (5), n is an integer of $2 \leq n \leq 10$, $R^1$ to $R^{26}$ denote each a substituent containing at least one element selected from the group consisting of carbon, hydrogen, oxygen, halogen, nitrogen, sulfur, phosphorus, boron and silicon, wherein voluntary substituents among $R^1$–$R^{26}$, preferably among $R^1$–$R^{2n}$ may form together a ring other than benzene ring and may contain atoms other than carbon.

Concrete examples of the polyether compound (c-2) represented by the above formula (5) include:
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane,
2-(diphenylmethyl)-1,3-dimethoxypropane,
2-(1-naphthyl)-1,3-dimethoxypropane,
2-(2-fluorophenyl)-1,3-dimethoxypropane,
2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-dicyclopentyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2-(1-methylbutyl)-2-isopropyl-1,3-dimethoxypropane,
2-(1-methylbutyl)-2-s-butyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-isopropyl-1,3-dimethoxypropane,
2-phenyl-2-s-butyl-1,3-dimethoxypropane,
2-benzyl-2-isopropyl-1,3-dimethoxypropane,
2-benzyl-2-s-butyl-1,3-dimethoxypropane,
2-phenyl-2-benzyl-1,3-dimethoxypropane,
2-cyclopentyl-2-isopropyl-1,3-dimethoxypropane,
2-cyclopentyl-2-s-butyl-1,3-dimethoxypropane,
2-cyclohexyl-2-isopropyl-1,3-dimethoxypropane,
2-cyclohexyl-2-s-butyl-1,3-dimethoxypropane,
2-isopropyl-2-s-butyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,2-dibenzyl-1,4-diethoxybutane,
2,3-dicyclohexyl-1,4-diethoxybutane,
2,3-diisopropyl-1,4-diethoxybutane,
2,2-bis(p-methylphenyl)-1,4-dimethoxybutane,
2,3-bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,3-diisobutoxypropane,
1,2-diisobutoxypropane,
1,2-diisobutoxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-diisobutyl-1,5-oxononane,
6,6-diisobutyldioxyheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisopropyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane,
2-isobutyl-2-ethoxymethyl-1,3-dimethoxycyclohexane,
tris(p-methoxyphenyl)phosphine,
methylphenylbis(methoxymethyl)silane,
diphenylbis(methoxymethyl)silane,
methylcyclohexylbis(methoxymethyl)silane,
di-t-butylbis(methoxymethyl)silane,
cyclohexyl-t-butylbis(methoxymethyl)silane and
i-propyl-t-butylbis(methoxymethyl)silane.

Among them, 1,3-diethers are used favorably and, in particular, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

The polyether compound (c-2) may be used in combination of two or more. It is also permissible to use the polyether compound (c-2) concurrently with the organosilicic compound (c-1).

As the electron donor (c), it is also possible to use concurrently therewith an organosilicic compound represented by the following formula (6).

$$R_n Si(OR^2)_{4-n} \qquad (6)$$

In the formula (6), R and $R^2$ represent each a hydrocarbyl group and n is $0 < n < 4$. The organosilicic compound of the formula (6) does not include the organosilicic compound (c-1) represented by the formula (3).

Concretely, there may be enumerated as the organosilicic compound represented by the formula (6), for example, trimethylmethoxysilane, trimethylethoxy-silane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-propyltriethoxysilane, decyltrimeth-oxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane) and vinyltriacetoxysilane.

Further, as analogous compounds, ethyl silicate, butyl silicate, dimethyltetraethoxydicycloxane and so on may also be used.

For polymerizing propylene using a catalyst composed of the solid titanium catalyst component (a), the organometallic compound (b) and the electron donor (c), a prepolymerization may be incorporated. In the prepolymerization, an olefin is polymerized in the presence of a titanium-based solid catalyst component (a), an organometallic compound (b) and, if necessary, an electron donor (c).

For the olefin to be pre-polymerized, there may be used, for example, a linear olefin, such as ethylene, propylene, 1-butene, 1-octene, 1-hexadecene or 1-eicosene; or an olefin having branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane or allyltrialkylsilanes. They may be co-polymerized.

The prepolymerization may favorably be carried out in such a manner that the polymerized product will be formed in an amount of about 0.1–1,000 g, preferably 0.3–500 g per 1 g of the titanium-based solid catalyst component (a). If the pre-polymerized amount is too large, the efficiency for producing the (co)polymer in the inherent polymerization may decrease.

In the prepolymerization, the catalyst may be used at a concentration considerably higher than that in the system of the inherent polymerization. The titanium-based solid catalyst component (a) may favorably be incorporated usually in a concentration of about 0.01–200 mmol, preferably about 0.05–100 mmol, calculated as the titanium atom, per one liter of the polymerization volume. The organometallic compound (b) may favorably be incorporated usually in an amount of about 0.1–100 mmol, preferably about 0.5–50 mmol, per one mole of titanium atom in the titanium-based solid catalyst component (a). The electron donor (c) may not necessarily be used in the prepolymerization, though it may be incorporated in an amount of about 0.1–50 moles, preferably 0.5–30 moles, more preferably 1–10 moles, per one mole of titanium atom in the titanium-based solid catalyst component (a).

The prepolymerization may favorably be carried out under a mild condition by adding the olefin to be pre-polymerized and the catalyst components to an inert hydrocarbon medium. As the inert hydrocarbon medium, there may be used aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures of them. Especially, aliphatic hydrocarbons are favorable to be used.

For the prepolymerization temperature, any temperature at which the prepolymer will not dissolve substantially in the inert hydrocarbon medium may be employed and, usually, a temperature of −20 to +100° C., preferably −20 to +80° C., more preferably 0 to +40° C., may be employed. The prepolymerization may be carried out in a batchwise or continuous process or otherwise. It is possible that a molecular weight regulation is incorporated using hydrogen gas or other means.

In the intrinsic polymerization, it is favorable to employ the titanium-based solid catalyst component (a) (or the catalyst for the prepolymerization) in an amount of about 0.0001–50 mmol, preferably about 0.001–10 mmol, calculated as titanium atom, per one liter of the polymerization volume. The organometallic compound (b) may favorably be used in an amount of about 1–2,000 moles, preferably about 2–500 moles, as calculated for the atomic weight of the metal per one mole of titanium atom in the polymerization system. The electron donor (c) may favorably be used in an amount of about 0.001–50 moles, preferably about 0.01–20 moles, per one mole of the metal atom of the organometallic compound (b).

On producing the first and the second poly-propylene-based resin compositions, it is preferable to employ a multistage polymerization of at least two stages, in which a polypropylene of a relatively higher molecular weight and a polypropylene of a relatively lower molecular weight are produced so as to obtain finally the polypropylene-based resin composition containing these polypropylenes of different molecular weights, wherein it is particularly preferable to employ a multistage polymerization of at least three stages. Here, the polymer molecular weight in each stage can be adjusted by, for example, altering the amount of hydrogen gas supplied to the polymerization system.

The polymerization may be effected in either of gas phase polymerization or liquid phase polymerization including solution polymerization and suspension polymerization, wherein each stage may be realized in a different way. It may be performed either in a batchwise, continuous or semi-continuous way. Each of the stages may be performed in a plurality of polymerization reactors, for example, in 2–10 reactors.

As the polymerization medium, inert hydrocarbon may be used and propylene in liquid state may be used therefor. The polymerization condition may be selected adequately within the ranges for the polymerization temperature of about −50° C.~−200° C., preferably about 20° C.~100° C., and for the polymerization pressure of normal pressure~9.8 MPa (normal pressure~100 kgf/cm² gauge), preferably 0.20~4.9 MPa (about 2~50 kgf/cm² gauge).

When a prepolymerization catalyst is employed, the titanium-based solid catalyst component (a) and the organometallic compound (b) may be added renewedly on requirement. The organometallic compound (b) used upon the prepolymerization and that used upon the intrinsic polymerization may be identical with or different from each other. The electron donor (c) must be used at least once in either the prepolymerization or the intrinsic polymerization, namely, it is used either only in the intrinsic polymerization or both in the prepolymerization and in the intrinsic polymerization. The electron donor (c) used upon the prepolymerization and that used upon the intrinsic polymerization may be identical with or different from each other. While it is permissible that these catalyst components are not replenished on each of the subsequent stages after the polymerization in the foregoing stage, they may be replenished adequately.

When the catalyst as described above is used, the resulting polypropylene-based resin composition will not suffer from any deterioration in the crystallinity or the stereospecificity index and no decrease in the activity of the catalyst is encountered, even in the case of using hydrogen upon the polymerization.

By the production process as described above, the content of the catalyst, especially of halogen in the polypropylene-based resin composition can relatively be decreased, since the polypropylene resin composition can be produced at a high yield per a unit amount of the titanium-based solid catalyst component (a). Therefore, a procedure for removing the catalyst in the polypropylene resin composition can be dispensed with and, at the same time, corrosion of the metal mold for molding formed articles using the finally obtained polypropylene-based resin composition will difficultly occur.

The first and the second polypropylene-based resin composition according to the present invention may contain, if necessary, additives and other polymers within a range not obstructing the purpose of the present invention. Thus, for example, it is possible to blend therein adequately a rubber component for improving the impact strength.

Concrete examples of such rubber component include non-crystalline or low-crystalline α-olefin copolymers having no diene component, such as ethylene/propylene copolymer rubber, ethylene/1-butene copolymer rubber, ethylene/1-octene copolymer rubber and propylene/ethylene copolymer rubber; ethylene/propylene/dicyclopentadiene copolymer rubber; ethylene/propylene/non-conjugated diene copolymer rubber, such as ethylene/propylene/1,4-hexadiene copolymer rubber, ethylene/propylene/cyclooctadiene copolymer rubber, ethylene/propylene/methylenenorbornene copolymer rubber and ethylene/propylene/ethylidenenorbornene copolymer rubber; and ethylene/butadiene copolymer rubber.

As the additives, there may be enumerated, for example, nucleating agent, antioxidant, hydrochloric acid absorber, heat stabilizer, anti-weathering agent, light stabilizer, UV-absorber, slipping agent, anti-blocking agent, antifogging agent, lubricating agent, antistatic agent, fire retardant, pigments, colorants, dispersant, copper-sequestering agent, neutralizing agent, foaming agent, plasticizer, bubble preventing agent, cross-linking agent, flowability improving agent, such as peroxides, weld strength improving agent, natural petroleum oils, synthetic oils, waxes and inorganic fillers.

The first and the second polypropylene-based resin compositions may contain the above-mentioned prepolymer, as a nucleating agent, or an inherent nucleating agent chosen among known ones or, further, the above-mentioned prepolymer together with an inherent nucleating agent. By inclusion or addition of a nucleating agent, micronization of the crystal grains and increase in the crystallization velocity are attained, whereby a high speed molding can be realized.

For example, when a nucleating agent is contained in the first and the second polypropylene-based resin compositions according to the present invention, it is possible to provide for a micronization of the crystals together with attainment of increased crystallization velocity to permit high speed molding. For the nucleating agent other than the prepolymer mentioned above, various nucleating agent known previously, such as nucleating agents based on phosphate, sorbitol, metal salts of aromatic or aliphatic carboxylic acids and inorganic substances, may be employed without any restriction.

As the inorganic filler, there may be enumerated, for example, talc, silica, mica, calcium carbonate, glass fiber, glass beads, barium sulfate, magnesium hydroxide, wollastonite, calcium silicate fiber, carbon fiber, magnesium oxysulfate fiber, potassium titanate whisker, titanium oxide, calcium sulfite, white carbon, clay and calcium sulfate. These inorganic fillers may be employed either alone or in a combination of two or more of them. Among these inorganic fillers, talc is used particularly favorably, since it contributes to improvements in the stiffness and in the impact strength. In particular, a grade of talc having an average particle size of 0.1–3 μm, preferably 0.5–2.5 μm, may favorably be employed, since such grade of talc provides a marked contribution to the improvements in the stiffness and in the impact strength.

The first and the second polypropylene-based resin composition according to the present invention are light-weighing, exhibit considerable high values of stiffness and heat stability and are superior in the scratchproof property and processibility with better flowability upon molding, together with superiorities in the impact strength, surface gloss, resistance to chemicals and abrasion resistance.

The first and the second polypropylene-based resin composition according to the present invention can be utilized without any restriction in application fields where the above-mentioned properties are required and are adapted for use as the raw resin material for injection molding, though they can be used also as the raw resin material for other molding techniques.

When the first and the second polypropylene-based resin compositions according to the present invention are used as the raw resin material for injection molding, it is possible to blend therewith other components such as the rubber component and the additives mentioned above. By blending the rubber component with the resin composition, the impact strength of the molded article can be improved. By adding a grade of talc, especially one which has the average particle size given above, the stiffness and the impact strength of the molded article can be improved.

If the injection-molded article is a part element of automobile or a household commodity, it is favorable to compound 40–100 parts by weight, preferably 55–85 parts by weight, of the first or the second polypropylene-based resin composition, 0–50 parts by weight, preferably 10–35 parts by weight, of the rubber component mentioned above and 0–60 parts by weight, preferably 5–25 parts by weight, of the inorganic filler. In the case of, in particular, trims of automobile, it is favorable to compound 50–100 parts by weight of the first or the second polypropylene-based resin composition, 0–40 parts by weight, preferably 0–25 parts by weight, of the rubber component mentioned above and 0–40 parts by weight, preferably 0–25 parts by weight, of the above-mentioned inorganic filler.

For the raw resin material for injection molding, it is possible to blend, for example, 0.05–1 part by weight of an antioxidant, 0–1 part by weight of a light stabilizer, 0–1 part by weight of a UV-absorber, 0–1 part by weight of an antistatic agent, 0.5–1 part by weight of a lubricating agent and 0–1 part by weight of a copper-sequestering agent per 100 parts by weight of the first or the second polypropylene-based resin composition according to the present invention.

The injection molded articles according to the present invention are those which are produced by injection-molding the first or the second polypropylene-based resin composition or a resin composition prepared by blending such polypropylene-based resin composition with other component(s). The injection-molded articles according to the present invention can be obtained by injection-molding the starting resin into contemplated configurations using a known injection-molding apparatus under a condition known per se. The injection molded articles according to the present invention are light-weighing, exhibit considerable high values of stiffness and heat stability and are superior in the scratchproof property, together with superiorities in the impact strength, surface gloss, resistance to chemicals, abrasion resistance and appearance, so that they are well suited for use as automobile parts, household electric instruments and other molded products.

Representative examples of the injection molded articles according to the present invention include automobile interior articles, such as armrest, indicator panel lower, indicator panel core, indicator panel upper, car cooler housing, console box, glove outdoor, glove box, trims, door trim, door pocket, speaker grill, high mount, relay fuse box, lamp housing, meter case, meter hood, pillar and center pillar; automobile exterior articles, such as bumper, front grill sides, license plate, louver garnish, side molding, bumper corner, bumper sides and side mudguard; other automobile parts, such as air cleaner case, junction box, sirocco fan, corrugate tubes, connectors, fan shroud, protectors, lamp housing, reserve tank (cap), air cleaner and battery case; household commodities, such as cleaner pipes, parts of dish-washer, parts of laundry machine, housings, hotplates and rice cooker body; and others, such as syringe, cap, connector, cartridge, daily utensils, medical instruments and miscellaneous goods.

As described above, the first or the second polypropylene-based resin compositions according to the present invention have each a specific material property and, thus, are light-weighing, exhibit very high stiffness and heat stability and are superior in the scratchproof property and in the processibility with better flowability upon molding. Therefore, the molded articles made of the polypropylene-based resin composition according to the present invention can be designed with thinner wall thicknesses and lower weight than conventional resin molded articles.

The injection molded articles according to the present invention are made of the first or the second polypropylene-based resin composition, so that they are light-weighing, exhibit quite high stiffness and heat stability and are superior in the scratchproof property and in the appearance and obtainable with an efficient productivity.

THE BEST MODE FOR EMBODYING THE INVENTION

PRODUCTION EXAMPLE 1

Polymerization of Propylene-I
1) Preparation of Solid Titanium Catalyst Component 95.2 g of anhydrous magnesium chloride, 442 ml of decane and 390.6 g of 2-ethylhexyl alcohol were heated at 130° C. for 2 hours so as to convert them into a uniform solution. To this solution were added 21.3 g of phthalic anhydride and the mixture was agitated at 130° C. for further 1 hour to dissolve the phthalic anhydride, whereupon the resulting homogeneous solution was cooled down to 23° C. 75 ml of this homogeneous solution were added dropwise to 200 ml of titanium tetrachloride maintained at −20° C. over a period of one hour. After the addition was over, the temperature of the resulting mixed liquid was elevated to 110° C. over a period of 4 hours. On reaching the temperature of 110° C., 5.22 g of diisobutyl phthalate (DIBP) were added thereto and the mixture was agitated for subsequent two hours while maintaining this temperature. Then the mixture was hot filtrated to collect the solid matter. This collected solid matter was re-suspended in 275 ml of titanium tetrachloride and the suspension was heated again at 110° C. for two hours. After the heating, the heated mixture was again hot filtrated to collect the solid matter, which was washed with decane and hexane of 110° C. until no titanium compound was detected in the washed liquid. The resulting solid titanium catalyst component obtained as above was stored as a slurry in hexane. A small portion of this catalyst slurry was dried to examine the catalyst composition. It was found that the solid titanium catalyst component had a titanium content of 2.5% by weight, a chlorine content of 58% by weight, a magnesium content of 18% by weight and a DIBP content of 13.8% by weight.

-2) Production of a Polypropylene-based Resin Composition V-1

In an autoclave having an inner volume of 17 liters, three kg of propylene were charged and the temperature thereof was elevated to 60° C., whereto were added 7.0 mmol of triethylaluminum. 7.0 mmol of dicyclopentyldimethoxysilane (DCPMS) and 0.7 mmol, calculated as titanium atom, of the solid titanium catalyst component obtained as above. The temperature was elevated to 70° C. (referred to as the polymerization temperature 1) and the polymerization was effected while maintaining this temperature for 10 minutes (referred to as the polymerization duration 1). Then, the venting valve was caused to open so as to purge the unreacted propylene through an integrating flowmeter (at this occasion, the first stage homo-polymerization of propylene was terminated).

After the purge, the venting valve was closed and the autoclave was charged with 3 kg of propylene and 0.7 liter of hydrogen gas, whereupon the temperature was elevated to 70° C. (referred to as the polymerization temperature 2) and the polymerization was effected while maintaining this temperature for 5 minutes (referred to as the polymerization duration 2). Then, the venting valve was caused to open so as to purge the unreacted propylene via an integrating flowmeter (at this occasion, the second stage homo-polymerization was terminated). A small portion of the resulting polypropylene after the first stage was sampled to determine the intrinsic viscosity thereof, whereby the intrinsic viscosity [$\eta$] was found to be 9.5 dl/g. The proportion of the amount of the polypropylene obtained in the first stage relative to the amount of the finally obtained polypropylene-based resin composition V-1 was found to be 15% by weight.

PRODUCTION EXAMPLES 2 TO 5

Only the procedures of the first stage homo-polymerization of propylene of Production Example 1 were repeated, whereby polypropylenes V-2 to V-5 were obtained.

PRODUCTION EXAMPLE 6

The procedures of Production Example 1 were pursued with the exception that the polymerization condition was changed to that given in Table 1 and the proportion of the amount of polypropylene obtained in the first stage homo-polymerization of propylene was altered to 40% by weight, whereby a polypropylene-based resin composition V-6 was obtained.

PRODUCTION EXAMPLE 7

The procedures of Production Example 1 were pursued with the exception that the polymerization condition was changed to that given in Table 1 and the proportion of the amount of polypropylene obtained in the first stage homo-polymerization of propylene was altered to 38% by weight, whereby a polypropylene-based resin composition V-7 was obtained.

PRODUCTION EXAMPLE 8

The procedures of Production Example 1 were pursued with the exception that cyclohexylmethyldimethoxysilane (CMDMS) was used instead of dicyclopentyl-dimethoxysilane (DCPMS) and that hydrogen gas supply was incorporated also in the first stage homo-polymerization of propylene to effect the polymerization in the same manner as in the second stage homo-polymerization of propylene, whereby a polypropylene-based resin composition V-8 was obtained.

PRODUCTION EXAMPLE 9

The polypropylene V-2 obtained in Production Example 2 and the polypropylene V-5 obtained in Production Example 5 were melt-blended in a proportion of 15% by weight of the former and 85% by weight of the latter to obtain a polypropylene-based resin composition V-9.

PRODUCTION EXAMPLE 10

The polypropylene-based resin composition V-6 obtained in Production Example 6 and the polypropylene-based resin composition V-7 obtained in Production Example 7 were melt-blended in a proportion of 79% by weight of the former and 21% by weight of the latter to obtain a polypropylene-based resin composition V-10.

PRODUCTION EXAMPLE 11

The polymerization was effected using a solid catalyst component constituted mainly of titanium trichloride prepared by reducing titanium tetrachloride with metallic aluminum and subjecting the resulting product to a treatment by crushing it together with diisobutyl phthalate, whereby a polypropylene-based resin composition V-11 was obtained.

PRODUCTION EXAMPLE 12

Polymerization of Propylene-II
-1) Preparation of Solid Titanium Catalyst Component A vibration mill was employed which is equipped with four crusher pots each having an inner volume of 4 liters and containing therein 9 kg of steel balls of 12 mm diameter. Each pot was charged with 300 g of magnesium chloride, 115 ml of diisobutyl phthalate and 60 ml of titanium tetrachloride under a nitrogen atmosphere and the contents were crushed for 40 hours. 5 grams of the resulting co-crushed mass were placed in a 200 ml flask, whereto 100 ml of toluene were added and the mixture was agitated at 114° C. for 30 minutes, whereupon the mixture was stood still and the supernatant was removed. The residue was washed with each 100 ml of n-heptane three times at 20° C. and was then dispersed in 100 ml of n-heptane to obtain a slurry of solid titanium catalyst. The resulting solid titanium catalyst contained 2.0% by weight of titanium and 18% by weight of diisobutyl phthalate.

-2) Production of Polypropylene-based Resin Composition V-12
-2-1) The First Stage Homo-polymerization of Propylene An autoclave having an inner volume of 200 liters was charged under a nitrogen atmosphere with 120 liters of heptane, 11.4 grams of diluted triethylaluminum, 23.2 grams of dicyclopentyldimethoxysilane and 6.0 grams of the solidtitanium catalyst obtained as above. Then, the nitrogen gas in the polymerization vessel was exhausted using a vacuum pump and the vessel was charged with propylene, whereupon the temperature of the vessel was started to elevate. At 60° C., propylene was supplied thereto continuously so as to maintain the polymerization vessel internal pressure (polymerization vessel internal pressure 1) at 0.31 MPa (3.2 kgf/cm$^2$ gauge) and the polymerization was continued for 1.6 hours (polymerization duration 1). By sampling and analyzing a part of the slurry in the polymerization vessel after the completion of the first stage polymerization, an intrinsic viscosoty [η] of 9.5 dl/g was observed.

-2-2) The Second Stage Homo-polymerization of Propylene

The temperature of the polymerization vessel was then elevated to 70° C. and thereto were supplied propylene and hydrogen gas continuously in such a manner that the polymerization vessel internal pressure (polymerization vessel internal pressure 2) was kept at 0.74 MPa (7.6 kgf/cm$^2$, gauge) and the hydrogen gas concentration in the gas phase (hydrogen concentration 2) was maintained at 55 vol. % so as to proceed the polymerization for 5.0 hours (polymerization duration 2) (the second stage homo-polymerization of propylene was over). At the end of the polymerization, 12 ml of methanol were added to the polymerization system to terminate the polymerization, whereupon purification and drying of the polymer product were carried out in conventional procedures and 58 kg of a powdery product of polypropylene-based resin composition V-12 were obtained. The MFR of the resulting polypropylene-based resin composition V-12 was found to be 34 g/10 min. The proportion of the polypropylene formed in the first stage homo-polymerization relative to the finally obtained polypropylene-based resin composition V-12 was calculated from the material balance to be 20.0% by weight.

PRODUCTION EXAMPLE 13

Polymerization of Propylene-III
-1) Preparation of Solid Titanium Catalyst Component The solid titanium catalyst component prepared in Production Example 12 was employed.

-2) Production of Polypropylene-based Resin Composition V-13
-2-1) The First Stage Homo-polymerization of Propylene An autoclave having an inner volume of 3,000 liters was charged under a nitrogen atmosphere with 1180 liters of heptane, 137 grams of diluted triethyl-aluminum, 280 grams of dicyclopentyldimethoxysilane and 72 grams of the solid titanium catalyst mentioned above. Then, the nitrogen gas in the polymerization vessel was exhausted using a vacuum pump and the vessel was charged with propylene and hydrogen gas, whereupon the temperature of the vessel was started to elevate. At 60° C., propylene was supplied thereto continuously so as to maintain the internal pressure (polymerization vessel internal pressure 1) at 0.29 MPa (3.0 kgf/cm$^2$ gauge) and the polymerization was continued for 1.6 hours (polymerization duration 1). By sampling and analyzing a part of the slurry in the polymerization vessel after the completion of the first stage polymerization, an intrinsic viscosoty [η] of 9.0 dl/g was observed.

-2-2) The Second Stage Homo-polymerization of Propylene

The temperature of the polymerization vessel was then elevated to 75° C. and thereto were supplied propylene and hydrogen gas continuously in such a manner that the polymerization vessel internal pressure (polymerization vessel internal pressure 2) was kept at 0.74 MPa (7.5 kgf/cm$^2$, gauge) and the hydrogen gas concentration in the gas phase was maintained at 61 vol. % (hydrogen concentration 2) so as to proceed the polymerization for 2.5 hours (polymerization duration 2) (the second stage homo-polymerization of propylene was over). At the end of the polymerization, 144 ml of methanol were added to the polymerization system to terminate the polymerization, whereupon purification and drying of the polymer product were effected in conventional procedures and 651 kg of a powdery product of polypropylene-based resin composition V-13 were obtained. The MFR of the resulting polypropylene-based resin composition V-13 was found to be 36 g/10 min. The proportion of the polypropylene formed in the first stage homo-polymerization relative to the finally obtained polypropylene-based resin composition V-13 was calculated from the material balance to be 19.0% by weight.

PRODUCTION EXAMPLE 14

The procedures of Production Example 13 were pursued with the exception that the polymerization condition was changed to that given in Table 2 and the proportion of the amount of polypropylene obtained in the first stage homo-polymerization of propylene was altered to 15.1% by weight, whereby a polypropylene-based resin composition V-14 was obtained.

PRODUCTION EXAMPLE 15

The procedures of Production Example 13 were pursued with the exception that the polymerization condition was changed to that given in Table 2 and the proportion of the amount of polypropylene obtained in the first stage homo-polymerization of propylene was altered to 22.0% by weight, whereby a polypropylene-based resin composition V-15 was obtained.

PRODUCTION EXAMPLE 16

The procedures of Production Example 13 were pursued with the exception that the polymerization condition was changed to that given in Table 2 and the proportion of the amount of polypropylene obtained in the first stage homo-polymerization of propylene was altered to 24.0% by weight, whereby a polypropylene-based resin composition V-16 was obtained.

PRODUCTION EXAMPLE 17

The procedures of Production Example 13 were pursued with the exception that the polymerization condition was changed to that given in Table 2 and the proportion of the amount of polypropylene obtained in the first stage homo-polymerization of propylene was altered to 15.2% by weight, whereby a polypropylene-based resin composition V-17 was obtained.

PRODUCTION EXAMPLE 18

Polymerization of Propylene-IV

-1) Preparation of Solid Titanium Catalyst Component

A vibration mill was employed which is equipped with four crusher pots each having an inner volume of 4 liters and containing therein 9 kg of steel balls of 12 mm diameter. Each pot was charged with 300 g of magnesium chloride, 115 ml of diisobutyl phthalate and 60 ml of titanium tetrachloride under a nitrogen atmosphere and the contents were crushed for 40 hours. 5 grams of the resulting co-crushed mass were placed in a 200 ml flask, whereto 100 ml of toluene were added and the mixture was agitated at 114° C. for 30 minutes, whereupon the mixture was stood still and the supernatant was removed. The residue was washed with each 100 ml of n-heptane three times at 20° C. and was then dispersed in 100 ml of n-heptane to obtain a slurry of solid titanium catalyst. The resulting solid titanium catalyst contained 1.8% by weight of titanium and 18% by weight of diisobutyl phthalate.

-2) Pre-polymerization of Solid Titanium Catalyst Component

An autoclave having an inner volume of 200 liters was charged with 250 g of the above solid titanium catalyst component, 32.1 grams of triethyl-aluminum and 125 liters of heptane. To the autoclave were then added 1250 grams of propylene while keeping the autoclave inner temperature at 10° C. and the mixture was agitated for 30 minutes, whereupon 18 grams of titanium tetrachloride were added thereto in order to produce a pre-polymerized titanium catalyst as a slurry.

-3) Production of Polypropylene-based Resin Composition V-18

-3-1) The First Stage Homo-polymerization of Propylene

A polymerization vessel 1 having an inner volume of 500 liters was supplied continuously with 44 liters/hr of heptane, 8.02 grams/hr of the above pre-polymerized catalyst as the catalyst, 15.2 grams/hr of triethylaluminum and 31.2 grams/hr of dicyclopentyldi-methoxysilane, while supplying thereto propylene continuously at 60° C. under a condition of substantial absence of hydrogen gas so as to maintain the polymerization vessel inner pressure at 0.27 MPa (2.8 kgf/cm$^2$ gauge). The slurry obtained by the polymerization was transferred continuously to a polymerization vessel 2 having an inner volume of 500 liters to cause further polymerization. The average reacted amount calculated from the material balance at the termination point of the first stage polymerization region was found to be 2,000 g/solid titanium catalyst component. By sampling a portion of the slurry in the polymerization vessel 1, an intrinsic viscosity [η] of 9.8 dl/g was observed.

-3-2) The 2nd–5th Stage Homo-polymerizations of Propylene

The polymerization vessel 2 was supplied with 54 liters/hr of heptane, while supplying thereto propylene and hydrogen gas continuously at 70° C. so as to maintain the polymerization vessel inner pressure at 0.60 MPa (6.1 kgf/cm$^2$, gauge) and the hydrogen gas concentration in the gas phase of the vessel at 44% by volume. The slurry discharged out of the polymerization vessel 2 was transferred to a polymerization vessel 3 having an inner volume of 500 liters. To the polymerization vessel 3, 31 liters/hr of heptane were supplied, while continuously supplying thereto propylene and hydrogen gas at 70° C. so as to keep the polymerization vessel inner pressure at 0.68 MPa (6.9 kgf/cm$^2$, gauge) and to maintain the hydrogen concentration in the gas phase of the vessel at 43% by volume. The slurry discharged out of the polymerization vessel 3 was transferred to a polymerization vessel 4 having an inner volume of 500 liters. To the polymerization vessel 4, 22 liters/hr of heptane were supplied, while continuously supplying thereto propylene and hydrogen gas at 70 °C. so as to keep the polymerization vessel inner pressure at 0.42 MPa (4.3 kgf/cm², gauge) and to maintain the hydrogen concentration in the gas phase of the vessel at 43% by volume. The slurry discharged out of the polymerization vessel 4 was transferred to a polymerization vessel 5 having an inner volume of 200 liters. To the polymerization vessel 5, 10 liters/hr of heptane were supplied, while continuously supplying thereto propylene and hydrogen gas at 70° C. so as to keep the polymerization vessel inner pressure at 0.31 MPa (3.2 kgf/cm², gauge) and to maintain the hydrogen concentration in the gas phase of the vessel at 43% by volume. The average reacted amount calculated from the material balance at the termination point of the final stage polymerization region was found to be 9,800 g/solid titanium catalyst component. The slurry discharged out of the polymerization vessel 5 was treated, after separation of unreacted monomer, by centrifugation to remove heptane and drying at 80° C. under a pressure of 70 mm Hg for 10 hours in conventional procedures to obtain a polypropylene-based resin composition V-18. This polypropylene-based resin composition V-18 was produced at a rate of 78 kg/hr and had an MFR of 18 g/10 min.

PRODUCTION EXAMPLE 19

Polymerization of Propylene-V

-1) Preparation of Solid Titanium Catalyst Component

The solid titanium catalyst component prepared in Production Example 1 was employed.

-2) Production of Polypropylene-based Resin Composition V-19

-2-1) The First Stage Homo-polymerization of Propylene

An autocalve having an inner volume of 600 liters was charged with 105 kg of liquid propylene and the temperature of the vessel was elevated to 70° C. Thereto were added then 138 mmol of triethylaluminum, 138 mmol of dicyclopentyldimethoxysilane and 1.5 mmol, calculated as titanium atom, of the above mentioned solid titanium catalyst, whereupon the polymerization was effected for 40 minutes. By sampling and analyzing a part of the slurry in the polymerization vessel after the completion of the first stage polymerization, an intrinsic viscosoty [η] of 10.3 dl/g was observed.

-2-2) The Second Stage Homo-polymerization of Propylene

Then, hydrogen gas was charged thereto at 7.5 kg/cm² and a further polymerization was caused for 25 minutes while maintaining a temperature of 70° C. The unreacted monomer in the slurry obtained in the vessel was gasified by relieving the pressure down to the normal pressure. Thereafter, the polymer product was separated from propylene gas using a filter, whereby 22 kg of the polymer product were obtained. The MFR of the so-obtained polypropylene was found to be 18 g/10 min. The proportion of the polypropylene formed in the first stage homo-polymerization relative to the finally obtained polypropylene-based resin composition V-19 was 28.2% by weight.

PRODUCTION EXAMPLE 20

Polymerization of Propylene-VI

-1) Preparation of Solid Titanium Catalyst Component

The solid titanium catalyst component prepared in Production Example 1 was employed.

-2) Production of Polypropylene-based Resin Composition V-20

-2-1) The First Stage Homo-polymerization of Propylene

An autoclave having an inner volume of 350 liters was charged with 180 liters of butane and the temperature of the vessel was elevated to 40° C. Thereto were added then 84 mmol of triethylaluminum, 17 mmol of dicyclopentyldimethoxysilane and 8.4 mmol, calculated as titanium atom, of the above mentioned solid titanium catalyst. Thereafter, 4.5 Nm³/hr of propylene gas were supplied thereto. Then, a two hours' aging at 40° C. of the contents of the vessel was incorporated to cause all the supplied propylene to be subjected to reaction. The intrinsic viscosoty [η] of the so-obtained polymer was observed to be 9.4 dl/g and the concentration of the slurry was found to be 102 g/l.

-2-2) The Second Stage Homo-polymerization of Propylene

An autocalve having an inner volume of 600 liters was charged with 105 kg of liquid propylene and the temperature of the vessel was elevated to 66° C. Thereto were supplied then continuously 56 kg/hr of liquid propylene, 73 mmol/hr of triethylaluminum, 73 mmol/hr of dicyclopentyldimethoxysilane and 10 liters/hr of the polymer slurry obtained as above, in order to effect the polymerization with a residence time of 1.4 hours.

The autoclave was charged with 8.4 mmol, calculated as titanium atom, of the solid titanium catalyst, whereupon propylene gas was supplied thereto at a rate of 4.5 Nm³/hr. Then, a two hours' aging at 40° C. of the contents of the autoclave was incorporated to cause all the supplied propylene to be subjected to reaction. The intrinsic viscosoty [η] of the so-obtained polymer was observed to be 9.4 dl/g and the concentration of the slurry was found to be 102 g/l. The unreacted monomer in the slurry obtained in the vessel was gasified by relieving the pressure down to the normal pressure. The polymer product was separated from propylene gas using a filter. The so-obtained polymer product amounted to 14 kg/hr and the MFR was found to be 25 g/10 min. The proportion of the polypropylene formed in the first stage homo-polymerization relative to the finally obtained polypropylene-based resin composition V-20 was 7.1% by weight.

PRODUCTION EXAMPLE 21

The procedures of Production Example 20 were pursued with the exception that the polymerization condition was changed to that given in Table 4 and the proportion of the amount of polypropylene obtained in the first stage homo-polymerization of propylene was altered to 9.2% by weight, whereby a polypropylene-based resin composition V-21 was obtained.

TABLE 1

| | Production Example | | | | | | |
|---|---|---|---|---|---|---|---|
| | 1 | 2 | 3 | 4 | 5 | 6 | 7 |
| Polypropylene-based Resin Composition | V-1 | V-2 | V-3 | V-4 | V-5 | V-6 | V-7 |
| 1st Stage Propylene Homo-polymerization | | | | | | | |
| Feed of Hydrogen Gas | none | used | used | used | used | used a bit | used a bit |
| Polymerization Temp. 1 (° C.) | 70 | 70 | 70 | 70 | 70 | 70 | 70 |
| Polymerization Duration 1 (min.) | 10 | 60 | 60 | 60 | 60 | 20 | 20 |
| Intrinsic Viscosity [η] (dl/g) | 9.5 | 2.7 | 2.0 | 1.6 | 1.3 | 2.0 | 4.0 |
| 2nd Stage propylene Homo-polymerization | | | | | | | |
| Feed of Hydrogen Gas | used | — | — | — | — | used | used |
| Polymerization Temp. 2 (° C.) | 70 | — | — | — | — | 70 | 70 |
| Polymerization Duration 2 (min.) | 5 | — | — | — | — | 5 | 5 |
| Intrinsic Viscosity [η] (dl/g) | 2.2 | — | — | — | — | 1.4 | 2.7 |

TABLE 2

| | Production Example | | | | | |
|---|---|---|---|---|---|---|
| | 12 | 13 | 14 | 15 | 16 | 17 |
| Polypropylene-based Resin Composition | V-12 | V-13 | V-14 | V-15 | V-16 | V-17 |
| 1st Stage Propylene Homo-polymerization | | | | | | |
| Feed of Hydrogen Gas | none | none | none | none | used a bit | none |
| Polymerization Temp. 1 (° C.) | 60 | 60 | 60 | 60 | 60 | 60 |
| Polymerization Duration 1 (min.) | 95 | 96 | 90 | 132 | 85 | 90 |
| Intrinsic Viscosity [η] (dl/g) | 9.5 | 9.0 | 9.3 | 9.3 | 6.0 | 8.0 |
| 2nd Stage propylene Homo-polymerization | | | | | | |
| Feed of Hydrogen Gas | used | used | used | used | used | used |
| Polymerization Temp. 2 (° C.) | 70 | 75 | 75 | 75 | 70 | 70 |
| Polymerization Duration 2 (min.) | 300 | 150 | 200 | 120 | 540 | 300 |
| Intrinsic Viscosity [η] (dl/g) | 1.7 | 1.7 | 1.5 | 1.8 | 1.5 | 1.7 |

TABLE 3

| | Prod. Example 18 |
|---|---|
| Polypropylene-based Resin Composition | V-18 |
| 1st Stage Propylene Homo-Polymerization | |
| Feed of Hydrogen Gas | none |
| Polymerization Temp. 1st Stage (° C.) | 60 |
| Polymerization Durat. 1st Stage (min.) | 170 |
| Intrinsic Viscosity (dl/g) | 9.8 |
| 2nd to 5th Stage Propylene Homo-Polymerization | |
| Feed of Hydrogen Gas | used |
| Polymerization Temp. 2–5 Stages (° C.) | 70 |
| Polymerization Durat. 2–5 St. (min.) | 300 |
| Intrinsic Viscosity 5th Stage (dl/g) | 1.9 |

TABLE 4

| | Production Example | | |
|---|---|---|---|
| | 19 | 20 | 21 |
| Polypropylene-based Resin Composition | V-19 | V-20 | V-21 |
| 1st Stage Propylene Homo-Polymerization | | | |
| Feed of Hydrogen Gas | none | none | none |
| Polymerization Temp. 1 (° C.) | 70 | 40 | 40 |
| Polymerization Duration 1 (min.) | 40 | 330 | 360 |
| Intrinsic Viscosity [η] (dl/g) | 10.3 | 9.4 | 9.8 |
| 2nd Stage Propylene Homo-Polymerization | | | |
| Feed of Hydrogen Gas | used | used | used |
| Polymerization Temp. 2 (° C.) | 70 | 66 | 60 |
| Polymerization Duration 2 (min.) | 25 | 84 | 84 |
| Intrinsic Viscosity [η] (dl/g) | 2.0 | 1.8 | 1.6 |

EXAMPLES 1 to 7 AND COMPARATIVE EXAMPLES 1 TO 10

In Tables 5–7, the material properties of the polypropylene-based resin compositions obtained in the Production Examples given above are recited. These polypropylene-based resin compositions were melt kneaded on a monoaxial extruder (of Ishinaka Tekkosho K.K.) at 200° C. in a prescribed formulation with additives to produce a pelletized product. This pelletized product was injection-molded, whereupon the material properties and the flowability were assessed. The results are summarized in Tables 5 to 7.

TABLE 5

| Polypropylene-based Resin Composition | | Example 1<br>V-1 | 2<br>V-12 | 3<br>V-13 | 4<br>V-14 | 5<br>V-15 | 6<br>V-18 | 7<br>V-19 |
|---|---|---|---|---|---|---|---|---|
| MFR *1 | g/10 min | 30 | 34 | 36 | 47 | 20 | 18 | 18 |
| I.V. of high mol. weight component *2 | dl/g | 9.5 | 9.5 | 9.0 | 9.3 | 9.3 | 9.8 | 10.3 |
| Content of high mol. weight component *3 | wt. % | 15.0 | 20.0 | 19.0 | 15.1 | 22.0 | 21.0 | 28.2 |
| mmmm proportion *4 | % | 98.4 | 98.5 | 98.5 | 98.8 | 98.0 | 98.1 | 98.0 |
| Mw/Mn *5 | — | 25.5 | 24.2 | 27.0 | 26.5 | 24.5 | 22.8 | 21.2 |
| Mz/Mw *6 | — | 9.3 | 9.3 | 8.4 | 9.5 | 7.3 | 7.4 | 8.1 |
| Specific gravity *7 | — | .910 | .912 | .913 | .913 | .912 | .911 | .912 |
| Flexural modulus *8 | MPa | 2670 | 3050 | 2900 | 2840 | 2820 | 2870 | 2940 |
| Heat distortion temp. (0.45 MPa) *9 | °C. | 154 | 150 | 148 | 151 | 148 | 150 | 147 |
| Heat distortion temp. (1.82 MPa) *10 | °C. | 110 | 110 | 103 | 105 | 111 | 109 | 111 |
| Rockwell hardness *11 | R-scale | 111 | 113 | 113 | 113 | 112 | 112 | 110 |
| Thickness of skin layer *12 | μm | 400 | 510 | 420 | 430 | 440 | 450 | 470 |
| Flowability *13 | cm | 152 | 156 | 161 | 173 | 130 | 131 | 132 |

TABLE 6

| Polypropylene-based Resin Composition | | Comparative Example 1<br>V-8 | 2<br>V-9 | 3<br>V-4 | 4<br>V-3 | 5<br>V-11 | 6<br>V-10 |
|---|---|---|---|---|---|---|---|
| MFR *1 | g/10 min | 28 | 28 | 27 | 13 | 31 | 28 |
| I.V. of high mol. weight component *2 | dl/g | — | — | — | — | — | 2.4 |
| Content of high mol. weight component *3 | wt. % | — | — | — | — | — | 40.0 |
| mmmm proportion *4 | % | 96.6 | 98.5 | 98.5 | 98.0 | 97.0 | 98.5 |
| Mw/Mn *5 | — | 5.4 | 6.5 | 8.9 | 11.0 | 7.9 | 9.4 |
| Mz/Mw *6 | — | 3.7 | 3.6 | 4.4 | 6.5 | 6.0 | 4.5 |
| Specific gravity *7 | — | .907 | .908 | .910 | .909 | .907 | .908 |
| Flexural modulus *8 | MPa | 1800 | 1930 | 2140 | 2030 | 2040 | 1990 |
| Heat distortion temp. (0.45 MPa) *9 | °C. | 132 | 137 | 142 | 140 | 135 | 138 |
| Heat distortion temp. (1.82 MPa) *10 | °C. | 79 | 80 | 88 | 92 | 80 | 81 |
| Rockwell hardness *11 | R-scale | 103 | 106 | 109 | 109 | 106 | 108 |
| Thickness of skin layer *12 | μm | 200 | 240 | 200 | 210 | 320 | 280 |
| Flowability *13 | cm | 105 | 105 | 105 | 96 | 125 | 122 |

TABLE 7

| Polypropylene-based Resin Composition | | Comparative Example 7<br>V-20 | 8<br>V-21 | 9<br>V-16 | 10<br>V-17 |
|---|---|---|---|---|---|
| MFR *1 | g/10 min | 25 | 34 | 34 | 35 |
| I.V. of high mol. weight component *2 | dl/g | 9.4 | 9.8 | 6.0 | 8.0 |
| Content of high mol. weight component *3 | wt. % | 7.1 | 9.2 | 24.0 | 15.2 |
| mmmm proportion *4 | % | 98.0 | 96.8 | 98.3 | 98.5 |
| Mw/Mn *5 | — | 11.8 | 15.6 | 24.0 | 11.3 |
| Mz/Mw *6 | — | 7.7 | 9.1 | 7.1 | 7.9 |
| Specific gravity *7 | — | .910 | .910 | .913 | .909 |
| Flexural modulus *8 | MPa | 2370 | 2280 | 2550 | 2420 |
| Heat distortion temp. (0.45 MPa) *9 | °C. | 144 | 142 | 145 | 141 |
| Heat distortion temp. (1.82 MPa) *10 | °C. | 93 | 90 | 108 | 102 |
| Rockwell hardness *11 | R-scale | 107 | 107 | 113 | 107 |
| Thickness of skin layer *12 | μm | 350 | 310 | 360 | 310 |
| Flowability *13 | cm | 140 | 153 | 150 | 148 |

Notes for Tables 5 to 7:
*1: Determined under the condition according to ASTM D 1238.
*2: Intrinsic viscosity, determined in decalin at 135° C.
*3: Calculated by the quotient [titanium content in the 1st stage polymerized polypropylene]/[titanium content in the final polypropylene-based resin composition].
*4: Determined by $^{13}$C-NMR.
*5: Determined by GPC.
*6: Determined by GPC.
*7: Determined by water-displacement method under the condition according to ASTM D 1505.
*8: Determined under the condition according to ASTM D 790.
*9: Determined under the condition according to ASTM D 648 at a load of 0.45 MPa.
*10: Determined under the condition according to ASTM D 648 at a load of 1.82 MPa.

TABLE 7-continued

|  | Comparative Example | | | |
|---|---|---|---|---|
|  | 7 | 8 | 9 | 10 |
| Polypropylene-based Resin Composition | V-20 | V-21 | V-16 | V-17 |

*11: Determined under the condition according to ASTM D 785 in the R-scale. This Rockwell hardness is served as the index for the scratchproof property, wherein the greater this value, the higher is the scratchproof property.
*12: Determined by observing the vertical section of an injection-molded article having a wall thickness of ⅛ inch under a microscope, said injection-molded article having been molded by injecting a resin of 190° C. into a mold of 60° C. and kept therein for 30 seconds.
*13: The flowability was determined by carrying out an injection molding test using a mold assigned for determining the resin flow length having a spiral flow path of a 3 mm thickness, a 10 mm width and 2,000 mm length with a molten resin of 210° C. and observing the flow length (of a spiral flow) as the index of the flowability. The greater this value, the better is the flowability.

EXAMPLE 8

Preparation of Solid Titanium Catalyst Component 95.2 g of anhydrous magnesium chloride, 442 ml of decane and 390.6 g of 2-ethylhexyl alcohol were heated at 130° C. for 2 hours so as to convert them into a uniform solution. To this solution were added 21.3 g of phthalic anhydride and the mixture was agitated at 130° C. for further 1 hour to dissolve the phthalic anhydride, whereupon the resulting homogeneous solution was cooled down to 23° C. 75 ml of this homogeneous solution were added dropwise to 200 ml of titanium tetrachloride maintained at −20° C. over a period of one hour. After the addition was over, the temperature of the resulting mixed liquid was elevated to 110° C. over a period of 4 hours. On reaching the temperature of 110° C., 5.22 g of diisobutyl phthalate (DIBP) were added thereto and the mixture was agitated for subsequent two hours while maintaining this temperature. Then the mixture was hot filtrated to collect the solid matter. This collected solid matter was re-suspended in 275 ml of titanium tetrachloride and the suspension was heated again at 110° C. for two hours. After the heating, the heated mixture was again hot filtrated to collect the solid matter, which was washed with decane and hexane of 110° C. until no titanium compound was detected in the washed liquid. The resulting solid titanium catalyst component obtained as above was stored as a slurry in hexane. A small portion of this catalyst slurry was dried and the catalyst composition was examined. It was found that the solid titanium catalyst component had a titanium content of 2.5% by weight, a chlorine content of 58% by weight, a magnesium content of 18% by weight and a DIBP content of 13.8% by weight.

Polymerization

In an autoclave having an inner volume of 17 liters, 3 kg of propylene were charged and the temperature thereof was elevated to 60° C., whereto were added 7.0 mmol of triethylaluminum, 7.0 mmol of dicyclopentyldimethoxysilane (DCPMS) and 0.7 mmol, calculated as titanium atom, of the solid titanium catalyst component obtained as above. The temperature was elevated to 70° C. and the polymerization was effected while maintaining this temperature for 10 minutes. Then, the venting valve was caused to open in order to purge the unreacted propylene through an integrating flowmeter (the first stage homo-polymerization of propylene was over).

After the purge, the venting valve was closed and the autoclave was charged with 3 kg of propylene and 0.7 liter of hydrogen gas, whereupon the temperature was elevated to 70° C. and the polymerization was effected while maintaining this temperature for 5 minutes. Then, the venting valve was caused to open so as to purge the unreacted propylene via an integrating flowmeter (the second stage homo-polymerization was over). The material properties of the resulting polypropylene-based resin composition are recited in Table 8. By sampling and analyzing a portion of the polypropylene after the first stage polymerization, the intrinsic viscosity [η] of the polypropylene obtained in the first stage was found to be 9.5 dl/g. The proportion of the amount of the polypropylene obtained in the first stage polymerization relative to the amount of the finally obtained polypropylene-based resin composition was found to be 15% by weight. The material properties of the finally obtained polypropylene-based resin composition are recited in Table 8.

The finally obtained polypropylene-based resin compositions were melt-kneaded on a monoaxial extruder (of the firm Ishinaka Tekkosho K.K.) at 200° C. in a prescribed formulation with additives to produce a pelletized product. This pelletized product was injection-molded on an injection molding machine Model J100SA II of The Japan Steel Works, Ltd at a resin temperature of 190° C. and a mold temperature of 60° C. to obtain an injection molded article. The injection-moldability was better.

COMPARATIVE EXAMPLE 11

The procedures of Example 8 were pursued with the exception that cyclohexylmethyldimethoxysilane (CMDMS) was used in the place of dicyclopentyldimethoxysilane (DCPMS) and that hydrogen gas supply was incorporated also in the first stage homo-polymerization of propylene to effect the polymerization in the same manner as in the second stage homo-polymerization of propylene, whereby a polypropylene was obtained. The material properties of this polypropylene were determined as in Example 8. The results are recited in Table 8.

COMPARATIVE EXAMPLE 12

A polypropylene-based resin composition was prepared by melt-blending polypropylene products B170 and B168 produced in the manner as given below in a weight proportion of 85/15. The material properties of this resin composition were determined as in Example 8. The results are recided in Table 8.

Polypropylene product B170:

Similarly to the procedures of the first and the second stage homo-polymerizations of propylene in Example 8, polymerizations were carried out, whereby finally a polypropylene product with MFR=50 g/10 min. was obtained.

Polypropylene product B168:

Similarly to the procedures of the first and the second stage homo-polymerizations of propylene in Example 8, polymerizations were carried out, whereby finally a polypropylene product with MFR=2 g/10 min. was obtained.

COMPARATIVE EXAMPLE 13

A polypropylene-based resin composition was prepared by melt-blending polypropylene products B176 and B178 as given below in a weight proportion of 79/21. The material properties of this resin composition were determined as in Example 8. The results are recided in Table 8.

Polypropylene product B176:

The procedures of Example 8 were pursued except that the intrinsic viscosity [η] of the polypropylene obtained in the first stage was 2.0 dl/g and the proportion was 40% by weight.

Polypropylene product B178:

The procedures of Example 8 were pursued except that the intrinsic viscosity [η] of the polypropylene obtained in the first stage was 4.0 dl/g and the proportion was 38% by weight.

COMPARATIVE EXAMPLE 14

The polymerization was effected using a solid catalyst component constituted mainly of titanium trichloride prepared by reducing titanium tetrachloride with metallic aluminum and subjecting the resulting product to a treatment by crushing it together with diisobutyl phthalate, whereby a polypropylene-based resin composition was obtained. The material properties of this resin composition were determined as in Example 8. The results are recited in Table 8.

TABLE 8

|  |  | Example | Comparative Example | | | |
|---|---|---|---|---|---|---|
|  |  | 8 | 11 | 12 | 13 | 14 |
| Melting point *1 | ° C. | 162.9 | 161.0 | 163.3 | 162.9 | 162.1 |
| Tc *2 | ° C. | 121.0 | 117.0 | 119.2 | 119.0 | 121.6 |
| Δ H *3 | mJ/mg | 123.6 | 113.9 | 118.1 | 120.5 | 109.1 |
| Mn *4 | × $10^4$ | 1.56 | 4.16 | 3.39 | 2.61 | 3.35 |
| Mw *4 | × $10^5$ | 3.98 | 2.22 | 2.20 | 2.45 | 2.65 |
| Mz *4 | × $10^6$ | 3.70 | 0.817 | 0.783 | 1.11 | 1.58 |
| Mw/Mn *4 | — | 25.46 | 5.35 | 6.49 | 9.41 | 7.92 |
| Mz/Mw *4 | — | 9.31 | 3.67 | 3.56 | 4.50 | 5.95 |
| mmmm Proportion *5 | % | 98.4 | 96.6 | 98.5 | 98.5 | 97.1 |
| Amount of 20° C. p-xylene soluble component *6 | wt. % | 1.2 | 1.8 | 0.8 | 0.8 | — |
| Melt flow rate *7 | g/10 min | 29.9 | 28.2 | 28.0 | 27.7 | 31.0 |
| Specific gravity *8 | — | 0.910 | 0.906 | 0.908 | 0.908 | 0.908 |
| Flexural modulus *9 | MPa | 2669 | 1797 | 1927 | 1986 | 2040 |
| IZ impact strength (23° C.) *10 | MPa | 17 | 21 | 21 | 21 | 21 |
| Heat distort. temp. (0.45 MPa) *11 | ° C. | 154 | 132 | 137 | 138 | 135 |
| Rockwell hardness *12 | R-scale | 111 | 103 | 106 | 108 | 108 |
| Pencil hardness *13 | — | F | HB | HB | HB | HB |
| Gloss *14 | % | 81 | 75 | 77 | 77 | 76 |
| Thickness of skin layer *15 | μm | 400 | 200 | 240 | 280 | 320 |
| Degree of orientation (C-axis) *16 | % | 83 | 64 | 65 | 80 | 80 |
| Degree of cristallinity *17 | % | 44 | 32 | 34 | 37 | 38 |

Notes for Table 8:
*1 Determined by DSC.
*2 Determined by DSC.
*3 Determined by DSC.
*4 Determined by GPC.
*5 Determined by $^{13}$C-NMR
*6 Determined by dissolving in hot xylene, cooling to 20° C., concentrating the solute after filtration and observing the weight of the soluble matter.
*7: Determined under the condition according to ASTM D 1238.
*8: Determined by water-displacement method under the condition according to ASTM D 1505.
*9: Determined under the condition according to ASTM D 790.
*10: Determined under the condition according to ASTM D 256 at 230° C.
*11: Determined under the condition according to ASTM D 648 at a load of 0.45 MPa.
*12: Determined under the condition according to ASTM D 785 in the R-scale.
*13: Determined under the condition according to JIS K-5400 at a load of 1 kg.
*14: Determined according to ASTM P 523 at an incidence angle of 60°.
*15: Determined by observing the vertical section of an injection-molded article having a wall thickness of ⅛ inch under a microscope, said injection-molded article having been molded by injecting a resin of 190° C. into a mold of 60° C. and kept therein for 30 seconds.
*16: Determined by wide angle penetration X-ray diffraction, in observation plane 110.
*17: Determined by wide angle reflection X-ray diffraction.

properties of this resin composition were determined as in Example 8. The results are recided in Table 8.

APPLICABILITY IN THE INDUSTRY

The polypropylene-based resin composition according to the present invention is light-weighing, has a very high values of stiffness and heat resistance and exhibits superior scratchproof property and better flowability upon molding or shaping with superior processibility, in addition to the excellencies in the impact resistance, surface gloss, resistance to chemicals and abrasion resistance, so that it is adapted to use as the raw resin material for injection molding, though it can be used as raw resin material for other shaping techniques.

Since the injection-molded articles according to the present invention are made of the above polypropylene-based resin composition, they are light-weighing, have very high values of stiffness and heat resistance and exhibit superior scratchproof property, in addition to the excellencies in the impact resistance, surface gloss, resistance to chemicals and abrasion resistance, so that they can represent high quality products of wide variety of articles such as automobile parts, household commodities and other molded articles.

What is claimed is:

1. A resin composition based on polypropylene, comprising a predominant proportion of polypropylene and having the following characteristic features A and B, namely,
    A: a melt flow rate (MFR), determined at 230° C. under a load of 2.16 kg, in the range of 5–50 g/10 min. and
    B: a content of a high molecular weight polypropylene having an intrinsic viscosity (η) of of 9–13 dl/g, wherein the high molecular weight polypropylene content is 15–30%, based on the total weight of the polypropylene resin composition.

2. The resin composition based on polypropylene as claimed in claim 1, wherein it has the following further characteristic feature C, namely,
    C: an isotactic pentad portion (mmmm proportion), determined by $^{13}$C-NMR, of 98.0 or higher.

3. The resin composition based on polypropylene as claimed in claim 1, wherein it has the following further characteristic feature D, namely,
    D: a molecular weight distribution expressed by Mw/Mn determined by gel permeation chromatography (GPC) of 20 or higher and a molecular weight distribution expressed by Mz/Mw or 7 or higher.

4. The resin composition based on polypropylene as claimed in claim 2, wherein it has the following further characteristic feature D, namely,
    D: a molecular weight distribution expressed by Mw/Mn determined by gel permeation chromatography (GPC) of 20 or higher and a molecular weight distribution expressed by Mz/Mw of 7 or higher.

5. The resin composition based on polypropylene as claimed in claim 1, wherein it has the following further characteristic features E to I, namely,
    E: a specific gravity determined by water-displacement method (ASTM D 1505) of 0.915 or lower,
    F: a flexural modulus (ASTM D 790) of 2600 MPa or higher,
    G: a thickness of the skin layer of at least 300 μm, which is formed on an injection-molded article when the resin composition of 190° C. is injected into a mold of 60° C. and held therein for 30 seconds,
    H: a heat distortion temperature (ASTM D 648, under a load of 0.45 MPa) of 145° C. or higher and
    I: a heat distortion temperature (ASTM D 648, under a load of 1.82 MPa) of 100° C. or higher.

6. The resin composition based on polypropylene as claimed in claim 2, wherein it has the following further characteristic features E to I, namely,
    E: a specific gravity determined by water-displacement method (ASTM D 1505) of 0.915 or lower,
    F: a flexural modulus (ASTM D 790) of 2600 MPa or higher,
    G: a thickness of the skin layer of at least 300 μm, which is formed on an injection-molded article when the resin composition of 190° C. is injected into a mold of 60° C. and held therein for 30 seconds,
    H: a heat distortion temperature (ASTM D 648, under a load of 0.45 MPa) of 145° C. or higher and
    I: a heat distortion temperature (ASTM D 648, under a load of 1.82 MPa) of 100° C. or higher.

7. The resin composition based on polypropylene as claimed in claim 3, wherein it has the following further characteristic features E to I, namely,
    E: a specific gravity determined by water-displacement method (ASTM D 1505) of 0.915 or lower,
    F: a flexural modulus (ASTM D 790) of 2600 MPa or higher,
    G: a thickness of the skin layer of at least 300 μm, which is formed on an injection-molded article when the resin composition of 190° C. is injected into a mold of 60° C. and held therein for 30 seconds,
    H: a heat distortion temperature (ASTM D 648, under a load of 0.45 MPa) of 145° C. or higher and
    I: a heat distortion temperature (ASTM D 648, under a load of 1.82 MPa) of 100° C. or higher.

8. The resin composition based on polypropylene as claimed in claim 4, wherein it has the following further characteristic features E to I, namely,
    E: a specific gravity determined by water-displacement method (ASTM D 1505) of 0.915 or lower,
    F: a flexural modulus (ASTM D 790) of 2600 MPa or higher,
    G: a thickness of the skin layer of at least 300° μm, which is formed on an injection-molded article when the resin composition of 190° C. is injected into a mold of 60° C. and held therein for 30 seconds,
    H: a heat distortion temperature (ASTM D 648, under a load of 0.45 MPa) of 145° C. or higher and
    I: a heat distortion temperature (ASTM D 648, under a load of 1.82 MPa) of 100° C. or higher.

9. A resin composition based on polypropylene comprising a predominant proportion of polypropylene and having the following characteristic features C to H, namely,
    C: an isotactic pentad proportion (mmmm proportion) determined by $^{13}$C-NMR of 98.0% or higher,
    D: a molecular weight distribution expressed by Mw/Mn determined by gel permeation chromatography (GPC) of 20 or higher and a molecular weight distribution expressed by Mz/Mw of 7 or higher,
    E: a specific gravity determined by water-displacement method (ASTM D 1505) of 0.915 or lower,
    F: a flexural modulus (ASTM D 790) of 2600 MPa or higher,
    G: a thickness of the skin layer of at least 300 μm, which is formed on an injection-molded article when the resin composition of 190° C. is injected into a mold of 60° C. and held therein for 30 seconds, and
    H: a heat distortion temperature (ASTM D 648, under a load of 0.45 MPa) of 145° C. or higher.

10. A resin composition based on polypropylene, comprising a predominant proportion of polypropylene and having the following characteristic features C to H, namely,
    C: an isotactic pentad proportion (mmmm proportion) determined by $^{13}$C-NMR of 98.0% or higher,
    D: a molecular weight distribution expressed by Mw/Mn determined by gel permeation chromatography (GPC) of 20 or higher and a molecular weight distribution expressed by Mz/Mw of 8 or higher,
    E: a specific gravity determined by water-displacement method (ASTM D 1505) of 0.910 or lower,
    F: a flexural modulus (ASTM D 790) of 2500 MPa or higher,
    G: a thickness of, the skin layer of at least 380 μm, which is formed on an injection-molded article when the resin composition of 190° C. is injected into a mold of 60° C. and held therein for 30 seconds, and H: a heat distortion temperature (ASTM D 648, under a load of 0.45 MPa) of 150° C. or higher.

11. The resin composition based on polypropylene as claimed in claim 9, wherein it has the following further characteristic features A and B, namely, A: a melt flow rate (MFR), determined at 230° C. under a load of 2.16 kg, in the range of 5–50 g/10 min. and B: a content of a high molecular weight polypropylene having an intrinsic viscosity ($\eta$) of 9–13 dl/g, wherein the high molecular weight polypropylene content is 15–30%, based on the total weight of the polypropylene resin composition.

12. The resin composition based on polypropylene as claimed in claim 10, wherein it has the following further characteristic features A and B, namely, A: a melt flow rate (MFR) determined at 230° C. under a load of 2.16 kg, in the range of 5–50 g/10 min. and B: a content of a high molecular weight polypropylene having an intrinsic viscosity ($\eta$) of 9–13 dl/g, wherein the high molecular weight polypropylene content is 15–30%, based on the total weight of the polypropylene resin composition.

13. The resin composition based on polypropylene as claimed in claim 9, wherein it has the following further characteristic feature I, namely I: a heat distortion temperature (ASTM D 648, under a load of 1.82 MPa) of 100° C. or higher.

14. The resin composition based on polypropylene as claimed in claim 10, wherein it has the following further characteristic feature I, namely I: a heat distortion temperature (ASTM D 648, under a load of 1.82 MPa) of 100° C. or higher.

15. The resin composition based on polypropylene as claimed in claim 11, wherein it has the following further characteristic feature I, namely I: a heat distortion temperature (ASTM D 648, under a load of 1.82 MPa) of 100° C. or higher.

16. The resin composition based on polypropylene as claimed in claim 12, wherein it has the following further characteristic feature I, namely I: a heat distortion temperature (ASTM D 648, under a load of 1.82 MPa) of 100° C. or higher.

17. Injection molded article produced by injection-molding a resin composition based on polypropylene as claimed in claim 1.

18. Injection molded article produced by injection-molding a resin composition based on polypropylene as claimed in claim 9.

19. Injection molded article produced by injection-molding a resin composition based on polypropylene as claimed in claim 10.

* * * * *